US011578263B2

(12) United States Patent
Haque et al.

(10) Patent No.: US 11,578,263 B2
(45) Date of Patent: Feb. 14, 2023

(54) CERAMIC-COATED PROPPANT

(71) Applicant: Saudi Arabian Oil Company, Dhahran (SA)

(72) Inventors: Mohammad Hamidul Haque, Katy, TX (US); Rajesh Kumar Saini, Cypress, TX (US)

(73) Assignee: Saudi Arabian Oil Company, Dhahran (SA)

( * ) Notice: Subject to any disclaimer, the term of this patent is extended or adjusted under 35 U.S.C. 154(b) by 81 days.

(21) Appl. No.: 16/872,619

(22) Filed: May 12, 2020

(65) Prior Publication Data
US 2021/0355372 A1 Nov. 18, 2021

(51) Int. Cl.
C09K 8/80 (2006.01)
E21B 43/267 (2006.01)
(52) U.S. Cl.
CPC .......... C09K 8/805 (2013.01); E21B 43/267 (2013.01)
(58) Field of Classification Search
CPC .......... C09K 8/805; C09K 8/80; C09K 8/508; C09K 8/536; E21B 43/267; E21B 43/04; E21B 43/00; E21B 43/26
See application file for complete search history.

(56) References Cited

U.S. PATENT DOCUMENTS

| | | |
|---|---|---|
| 701,154 A | 5/1902 | Cole |
| 830,437 A | 9/1906 | Humphrey |
| 2,900,269 A | 8/1959 | Bauman et al. |
| 3,284,281 A | 11/1966 | Thomas |
| 3,316,965 A | 5/1967 | Watanabe |
| 3,456,183 A | 7/1969 | Codrington et al. |
| 3,616,855 A | 11/1971 | Colgate |
| 3,690,622 A | 9/1972 | Brunner et al. |
| 3,716,387 A | 2/1973 | Simmons et al. |
| 3,807,557 A | 4/1974 | Miller |
| 3,912,330 A | 10/1975 | Carnahan et al. |
| 3,926,575 A | 12/1975 | Meyers |
| 3,977,472 A | 8/1976 | Graham et al. |
| 3,996,062 A | 12/1976 | Frost |
| 4,043,599 A | 8/1977 | Lingane |
| 4,043,885 A | 8/1977 | Yen et al. |
| 4,047,988 A | 9/1977 | Weill |
| 4,195,010 A | 3/1980 | Russell et al. |
| 4,220,550 A | 9/1980 | Frenier et al. |
| 4,223,726 A | 9/1980 | Cha |

(Continued)

FOREIGN PATENT DOCUMENTS

| | | |
|---|---|---|
| CA | 2322118 | 12/2007 |
| CA | 2635868 | 12/2008 |

(Continued)

OTHER PUBLICATIONS

"Hydraulic Fracturing Fluid Product Component Information Disclosure," 2012, 2 pages.

(Continued)

Primary Examiner — Zakiya W Bates
(74) Attorney, Agent, or Firm — Fish & Richardson P.C.

(57) ABSTRACT

A method of forming a ceramic-coated proppant, including receiving a proppant or particle and coating the proppant or particle with ceramic to give a ceramic coating on the proppant or particle. A method of hydraulic fracturing a geological formation with the ceramic-coated proppant.

22 Claims, 5 Drawing Sheets

(56) References Cited

U.S. PATENT DOCUMENTS

| | | |
|---|---|---|
| 4,252,189 A | 2/1981 | Bodine |
| 4,289,639 A | 9/1981 | Buske |
| 4,324,560 A | 4/1982 | Fonseca |
| 4,381,950 A | 5/1983 | Lawson |
| 4,444,058 A | 4/1984 | Ratigan |
| 4,480,696 A | 11/1984 | Almond et al. |
| 4,493,875 A | 1/1985 | Beck et al. |
| 4,587,739 A | 5/1986 | Holcomb |
| 4,594,170 A | 6/1986 | Brown et al. |
| 4,640,692 A | 2/1987 | Audeh |
| 4,681,914 A | 7/1987 | Olson et al. |
| 4,708,805 A | 11/1987 | D'Muhala |
| 4,718,489 A | 1/1988 | Hallam et al. |
| 4,780,223 A | 10/1988 | Baranet et al. |
| 4,830,773 A | 5/1989 | Olson |
| 4,830,779 A | 5/1989 | Maeno et al. |
| 4,864,472 A | 9/1989 | Yoshimura |
| 4,887,670 A | 12/1989 | Lord et al. |
| 5,031,700 A | 7/1991 | McDougall et al. |
| 5,193,396 A | 3/1993 | Gorski |
| 5,199,490 A | 4/1993 | Surles et al. |
| 5,213,705 A | 5/1993 | Olson |
| 5,224,543 A | 7/1993 | Watkins |
| 5,232,490 A | 8/1993 | Bender et al. |
| 5,302,297 A | 4/1994 | Barthrope |
| 5,435,187 A | 7/1995 | Ewy |
| 5,604,184 A | 2/1997 | Ellis et al. |
| 5,757,473 A | 5/1998 | Kanduth et al. |
| 5,759,964 A | 6/1998 | Shuchart |
| 5,869,750 A | 2/1999 | Onan |
| 5,999,887 A | 12/1999 | Giannakopoulos et al. |
| 6,076,046 A | 6/2000 | Vassudevan |
| 6,095,679 A | 8/2000 | Hammiche et al. |
| 6,131,661 A | 10/2000 | Conner et al. |
| 6,138,760 A | 10/2000 | Lopez et al. |
| 6,143,698 A | 11/2000 | Murphey et al. |
| 6,165,295 A | 12/2000 | Wagaman |
| 6,227,295 B1 | 5/2001 | Mitchell et al. |
| 6,349,595 B1 | 2/2002 | Lorenzo et al. |
| 6,411,902 B1 | 6/2002 | Wiltshire |
| 6,488,091 B1 | 12/2002 | Weaver |
| 6,491,425 B1 | 12/2002 | Hammiche et al. |
| 6,494,263 B2 | 12/2002 | Todd |
| 6,516,080 B1 | 2/2003 | Nur |
| 6,579,572 B2 | 6/2003 | Espin et al. |
| 6,652,682 B1 | 11/2003 | Fawls |
| 6,705,398 B2 | 3/2004 | Weng |
| 6,715,553 B2 | 4/2004 | Reddy et al. |
| 6,729,409 B1 | 5/2004 | Gupta et al. |
| 6,749,022 B1 | 6/2004 | Fredd |
| 6,776,235 B1 | 8/2004 | England |
| 6,832,158 B2 | 12/2004 | Mese |
| 6,846,420 B2 | 1/2005 | Reddy et al. |
| 6,866,048 B2 | 3/2005 | Mattox |
| 6,884,760 B1 | 4/2005 | Brand et al. |
| 6,947,843 B2 | 9/2005 | Fisher et al. |
| 6,989,391 B2 | 1/2006 | Funkhouser |
| 7,007,752 B2 | 3/2006 | Reddy et al. |
| 7,011,154 B2 | 3/2006 | Maher et al. |
| 7,044,220 B2 | 5/2006 | Nguyen et al. |
| 7,086,484 B2 | 8/2006 | Smith |
| 7,098,663 B1 | 8/2006 | Bader |
| 7,210,528 B1 | 5/2007 | Brannon et al. |
| 7,255,169 B2 | 8/2007 | Van Batenburg et al. |
| 7,261,158 B2 | 8/2007 | Middaugh et al. |
| 7,281,580 B2 | 10/2007 | Parker et al. |
| 7,281,581 B2 | 10/2007 | Nyuyen et al. |
| 7,326,670 B2 | 2/2008 | DiLullo et al. |
| 7,334,635 B2 | 2/2008 | Nguyen |
| 7,334,636 B2 | 2/2008 | Nguyen |
| 7,344,889 B2 | 3/2008 | Kelemen et al. |
| 7,369,980 B2 | 5/2008 | Deffenbaugh et al. |
| 7,424,911 B2 | 9/2008 | McCarthy et al. |
| 7,451,812 B2 | 11/2008 | Cooper et al. |
| 7,472,751 B2 | 1/2009 | Brannon et al. |
| 7,491,444 B2 | 2/2009 | Smith et al. |
| 7,500,517 B2 | 3/2009 | Looney et al. |
| 7,513,306 B2 | 4/2009 | Pfefferle et al. |
| 7,526,418 B2 | 4/2009 | Pita et al. |
| 7,527,097 B2 | 5/2009 | Patel |
| 7,565,831 B2 | 7/2009 | Miyahara |
| 7,571,767 B2 | 8/2009 | Parker et al. |
| 7,581,590 B2 | 9/2009 | Lesko et al. |
| 7,588,085 B2 | 9/2009 | Acock et al. |
| 7,621,173 B2 | 11/2009 | Hsu |
| 7,642,223 B2 | 1/2010 | Santra et al. |
| 7,645,883 B1 | 1/2010 | Hawkins et al. |
| 7,654,159 B2 | 2/2010 | Enoksson |
| 7,678,723 B2 | 3/2010 | Duenckel et al. |
| 7,703,531 B2 | 4/2010 | Huang |
| 7,770,647 B2 | 8/2010 | Watson et al. |
| 7,771,549 B1 | 8/2010 | Christe et al. |
| 7,789,164 B2 | 9/2010 | Looney et al. |
| 7,803,740 B2 | 9/2010 | Bicerano et al. |
| 7,825,053 B2 | 11/2010 | Duenckel et al. |
| 7,857,055 B2 | 12/2010 | Li |
| 7,867,613 B2 | 1/2011 | Smith et al. |
| 7,878,248 B2 | 2/2011 | Abad et al. |
| 7,887,918 B2 | 2/2011 | Smith et al. |
| 7,918,277 B2 | 4/2011 | Brannon et al. |
| 7,921,911 B2 | 4/2011 | Fuller et al. |
| 7,983,845 B2 | 7/2011 | Minh |
| 8,003,212 B2 | 8/2011 | Smith et al. |
| 8,003,577 B2 | 8/2011 | Li et al. |
| 8,006,760 B2 | 8/2011 | Fleming et al. |
| 8,047,288 B2 | 11/2011 | Skala et al. |
| 8,061,424 B2 | 11/2011 | Willberg et al. |
| 8,066,068 B2 | 11/2011 | Lesko et al. |
| 8,104,536 B2 | 1/2012 | Looney et al. |
| 8,119,576 B2 | 2/2012 | Reyes et al. |
| 8,127,850 B2 | 3/2012 | Brannon et al. |
| 8,146,416 B2 | 4/2012 | Pisio et al. |
| 8,165,817 B2 | 4/2012 | Betancourt et al. |
| 8,177,422 B2 | 5/2012 | Kjoller et al. |
| 8,205,675 B2 | 6/2012 | Brannon et al. |
| 8,216,675 B2 | 7/2012 | Palamara et al. |
| 8,225,866 B2 | 7/2012 | Rouffignac et al. |
| 8,278,931 B2 | 10/2012 | Fang et al. |
| 8,352,228 B2 | 1/2013 | Walters et al. |
| 8,380,437 B2 | 2/2013 | Abousleiman et al. |
| 8,408,305 B2 | 4/2013 | Brannon et al. |
| 8,473,213 B2 | 6/2013 | Zhu et al. |
| 8,490,700 B2 | 7/2013 | Lesko et al. |
| 8,614,157 B2 | 12/2013 | Pope et al. |
| 8,616,294 B2 | 12/2013 | Zubrin et al. |
| 8,636,065 B2 | 1/2014 | Lesko et al. |
| 8,701,788 B2 | 4/2014 | Wigand et al. |
| 8,729,903 B2 | 5/2014 | Srnka et al. |
| 8,757,259 B2 | 6/2014 | Lesko et al. |
| 8,763,699 B2 | 7/2014 | Medvedev et al. |
| 8,763,703 B2 | 7/2014 | Saini et al. |
| 8,796,187 B2 | 8/2014 | Reyes et al. |
| 8,822,386 B2 | 9/2014 | Quintero et al. |
| 8,835,363 B2 | 9/2014 | Amanullah et al. |
| 8,839,860 B2 | 9/2014 | Wigand et al. |
| 8,844,366 B2 | 9/2014 | Warren |
| 8,851,177 B2 | 10/2014 | Wigand |
| 8,865,482 B2 | 10/2014 | Wang et al. |
| 8,868,385 B2 | 10/2014 | Fertig et al. |
| 8,883,693 B2 | 11/2014 | Eldred et al. |
| 8,936,083 B2 | 1/2015 | Nguyen |
| 8,936,089 B2 | 1/2015 | Wigand |
| 9,006,151 B2 | 4/2015 | Amanullah et al. |
| 9,006,153 B2 | 4/2015 | Lin et al. |
| 9,033,033 B2 | 5/2015 | Thomas et al. |
| 9,033,043 B2 | 5/2015 | Hinkel |
| 9,057,797 B2 | 6/2015 | Omeragic et al. |
| 9,080,440 B2 | 7/2015 | Panga et al. |
| 9,085,727 B2 | 7/2015 | Litvinets et al. |
| 9,128,210 B2 | 9/2015 | Pomerantz |
| 9,133,398 B2 | 9/2015 | Wigand et al. |
| 9,152,745 B2 | 10/2015 | Glinsky |
| 9,297,244 B2 | 3/2016 | Mahoney et al. |
| 9,523,268 B2 | 12/2016 | Potapenko et al. |

(56) References Cited

U.S. PATENT DOCUMENTS

| | | |
|---|---|---|
| 9,644,137 B2 | 5/2017 | Dean et al. |
| 9,664,018 B2 | 5/2017 | Vandeponseele et al. |
| 9,670,764 B2 | 6/2017 | Lesko et al. |
| 9,688,904 B2 | 6/2017 | Wang et al. |
| 9,696,270 B1 | 7/2017 | Roy et al. |
| 9,725,645 B2 | 8/2017 | Monastiriotis et al. |
| 9,753,016 B1 | 9/2017 | Daugela |
| 9,784,882 B2 | 10/2017 | Vinegar et al. |
| 9,816,365 B2 | 11/2017 | Nguyen et al. |
| 9,834,721 B2 | 12/2017 | Chang et al. |
| 9,863,211 B2 | 1/2018 | Gamage et al. |
| 9,863,230 B2 | 1/2018 | Litvinets et al. |
| 9,863,231 B2 | 1/2018 | Hull et al. |
| 9,869,649 B2 | 1/2018 | Hull et al. |
| 9,885,691 B1 | 2/2018 | Daugela |
| 9,895,670 B2 | 2/2018 | Anders et al. |
| 9,896,919 B1 | 2/2018 | Chen |
| 9,902,898 B2 | 2/2018 | Nelson et al. |
| 9,909,404 B2 | 3/2018 | Hwang et al. |
| 9,927,344 B2 | 3/2018 | Chertov |
| 9,995,125 B2 | 6/2018 | Madasu et al. |
| 9,995,220 B2 | 6/2018 | Hawie et al. |
| 10,001,769 B2 | 6/2018 | Huang et al. |
| 10,023,782 B2 | 7/2018 | Wang et al. |
| 10,030,495 B2 | 7/2018 | Litvinets et al. |
| 10,047,281 B2 | 8/2018 | Nguyen et al. |
| 10,066,149 B2 | 9/2018 | Li et al. |
| 10,077,396 B2 | 9/2018 | Nguyen et al. |
| 10,113,396 B2 | 10/2018 | Nelson et al. |
| 10,151,715 B2 | 12/2018 | Hull et al. |
| 10,273,398 B2 | 4/2019 | Liu et al. |
| 10,329,478 B2 | 6/2019 | Schnoor et al. |
| 10,351,758 B2 | 7/2019 | Hull et al. |
| 10,379,068 B2 | 8/2019 | Hull et al. |
| 10,421,897 B2 | 9/2019 | Skiba et al. |
| 10,472,555 B2 | 11/2019 | Hutchins et al. |
| 10,479,927 B2 | 11/2019 | Hull et al. |
| 10,550,314 B2 | 2/2020 | Liang et al. |
| 2002/0003115 A1 | 1/2002 | Conaway et al. |
| 2003/0209248 A1 | 11/2003 | Ward |
| 2003/0212465 A1 | 11/2003 | Howard et al. |
| 2004/0101457 A1 | 5/2004 | Pahlman et al. |
| 2004/0211567 A1 | 10/2004 | Aud |
| 2005/0059558 A1 | 3/2005 | Blauch |
| 2005/0060130 A1 | 3/2005 | Shapiro et al. |
| 2005/0103118 A1 | 5/2005 | Workman |
| 2005/0274523 A1 | 12/2005 | Brannon et al. |
| 2006/0047489 A1 | 3/2006 | Scheidt et al. |
| 2006/0092766 A1 | 5/2006 | Shelley et al. |
| 2006/0265204 A1 | 11/2006 | Wallis et al. |
| 2007/0054054 A1 | 3/2007 | Svoboda et al. |
| 2007/0087940 A1 | 4/2007 | Qu et al. |
| 2007/0203677 A1 | 8/2007 | Awwiller |
| 2007/0235181 A1 | 10/2007 | Lecampion et al. |
| 2007/0298979 A1 | 12/2007 | Perry et al. |
| 2008/0006410 A1 | 1/2008 | Looney et al. |
| 2008/0059140 A1 | 3/2008 | Salmon et al. |
| 2008/0070806 A1 | 3/2008 | Lin et al. |
| 2008/0081771 A1 | 4/2008 | Lin et al. |
| 2008/0093073 A1 | 4/2008 | Bustos et al. |
| 2008/0234147 A1 | 9/2008 | Li et al. |
| 2009/0032252 A1 | 2/2009 | Boney et al. |
| 2009/0044945 A1 | 2/2009 | Wilberg et al. |
| 2009/0071239 A1 | 3/2009 | Rojas et al. |
| 2009/0087912 A1 | 4/2009 | Ramos et al. |
| 2009/0143252 A1 | 6/2009 | Lehmann |
| 2009/0145607 A1 | 6/2009 | Li et al. |
| 2009/0193881 A1 | 8/2009 | Finnberg |
| 2009/0203557 A1 | 8/2009 | Barnes et al. |
| 2009/0242196 A1 | 10/2009 | Pao |
| 2009/0248309 A1 | 10/2009 | Nelville et al. |
| 2009/0253595 A1 | 10/2009 | Qu |
| 2009/0283257 A1 | 11/2009 | Becker |
| 2009/0313772 A1 | 12/2009 | Talley |
| 2010/0010106 A1 | 1/2010 | Crews |
| 2010/0049625 A1 | 2/2010 | Biebesheimer et al. |
| 2010/0051511 A1 | 3/2010 | Faerman |
| 2010/0121623 A1 | 5/2010 | Yogeswaren |
| 2010/0128982 A1 | 5/2010 | Dvorkin et al. |
| 2010/0186520 A1 | 7/2010 | Wheeler |
| 2010/0213579 A1 | 8/2010 | Henry |
| 2010/0224365 A1 | 9/2010 | Abad |
| 2010/0243242 A1 | 9/2010 | Boney et al. |
| 2010/0258265 A1 | 10/2010 | Karanikas et al. |
| 2010/0263867 A1 | 10/2010 | Horton et al. |
| 2010/0276142 A1 | 11/2010 | Skildum et al. |
| 2010/0279136 A1 | 11/2010 | Bonucci |
| 2010/0323933 A1 | 12/2010 | Fuller et al. |
| 2011/0065612 A1 | 3/2011 | Stokes et al. |
| 2011/0257944 A1 | 10/2011 | Du et al. |
| 2011/0259588 A1 | 10/2011 | Ali |
| 2012/0018159 A1 | 1/2012 | Gulta et al. |
| 2012/0026037 A1 | 2/2012 | Thomson et al. |
| 2012/0129737 A1 | 5/2012 | Lesko et al. |
| 2012/0179444 A1 | 7/2012 | Ganguly et al. |
| 2012/0193578 A1 | 8/2012 | Pan et al. |
| 2012/0247774 A1 | 10/2012 | Li et al. |
| 2012/0261129 A1 | 10/2012 | Becker |
| 2012/0261617 A1 | 10/2012 | Pan et al. |
| 2012/0267102 A1 | 10/2012 | Huang et al. |
| 2012/0277130 A1* | 11/2012 | Usova ............... C04B 35/62695 507/269 |
| 2012/0305247 A1 | 12/2012 | Chen et al. |
| 2012/0318498 A1 | 12/2012 | Parsche |
| 2013/0013209 A1 | 1/2013 | Zhu et al. |
| 2013/0014945 A1* | 1/2013 | Fang ..................... E21B 43/267 507/273 |
| 2013/0056213 A1 | 3/2013 | Medvedev et al. |
| 2013/0084643 A1 | 4/2013 | Commarieu et al. |
| 2013/0137610 A1 | 5/2013 | Huang |
| 2013/0160994 A1 | 6/2013 | Alsop et al. |
| 2013/0161002 A1 | 6/2013 | Wigand |
| 2013/0161003 A1 | 6/2013 | Mikhailovich et al. |
| 2013/0213120 A1 | 8/2013 | Lebedev |
| 2013/0213638 A1 | 8/2013 | Keller |
| 2013/0228019 A1 | 9/2013 | Meadows |
| 2013/0231908 A1 | 9/2013 | Williams et al. |
| 2013/0233536 A1 | 9/2013 | Alqam |
| 2013/0238304 A1 | 9/2013 | Glinsky |
| 2013/0269933 A1 | 10/2013 | Pomerantz et al. |
| 2013/0274149 A1 | 10/2013 | Lafitte et al. |
| 2013/0275099 A1 | 10/2013 | Frydman |
| 2013/0306321 A1 | 11/2013 | Lanctot-Downs et al. |
| 2013/0341028 A1 | 12/2013 | Christian et al. |
| 2014/0008305 A1 | 1/2014 | Nichols et al. |
| 2014/0027109 A1 | 1/2014 | Al-Baraik |
| 2014/0045732 A1 | 2/2014 | Mazyar |
| 2014/0048694 A1 | 2/2014 | Pomerantz |
| 2014/0090850 A1 | 4/2014 | Benicewicz |
| 2014/0096964 A1 | 4/2014 | Chakraborty et al. |
| 2014/0116710 A1 | 5/2014 | Naser-El-Din et al. |
| 2014/0221257 A1 | 8/2014 | Roddy |
| 2014/0231077 A1 | 8/2014 | Rivero et al. |
| 2014/0243246 A1 | 8/2014 | Hendrickson |
| 2014/0247997 A1 | 9/2014 | Nishyama |
| 2014/0251605 A1 | 9/2014 | Hera |
| 2014/0260694 A1 | 9/2014 | Szlendak |
| 2014/0364343 A1 | 12/2014 | Nelson et al. |
| 2014/0367100 A1 | 12/2014 | Oliveria et al. |
| 2014/0374104 A1 | 12/2014 | Kushal |
| 2015/0019183 A1 | 1/2015 | Suzuki |
| 2015/0041136 A1 | 2/2015 | Martin |
| 2015/0055438 A1 | 2/2015 | Yan et al. |
| 2015/0057097 A1 | 2/2015 | Cho |
| 2015/0057196 A1 | 2/2015 | Debord |
| 2015/0065398 A1 | 3/2015 | Gartland et al. |
| 2015/0071750 A1 | 3/2015 | Foster |
| 2015/0072902 A1 | 3/2015 | Lafitte et al. |
| 2015/0075782 A1 | 3/2015 | Sharma |
| 2015/0083405 A1 | 3/2015 | Dobroskok |
| 2015/0152724 A1 | 6/2015 | Amendt |
| 2015/0167440 A1 | 6/2015 | Kasevich |
| 2015/0192005 A1 | 7/2015 | Saeedfar |
| 2015/0259593 A1 | 9/2015 | Kaufman et al. |

(56) References Cited

U.S. PATENT DOCUMENTS

| | | |
|---|---|---|
| 2015/0284625 A1 | 10/2015 | Silveira |
| 2015/0293256 A1 | 10/2015 | Dusterhoft |
| 2015/0300140 A1 | 10/2015 | Eoff et al. |
| 2015/0322759 A1 | 11/2015 | Okoniewski |
| 2015/0368541 A1 | 12/2015 | Monclin et al. |
| 2016/0017202 A1 | 1/2016 | Yang et al. |
| 2016/0061017 A1 | 3/2016 | Nguyen et al. |
| 2016/0103047 A1 | 4/2016 | Liu |
| 2016/0103049 A1 | 4/2016 | Liu |
| 2016/0130496 A1 | 5/2016 | Holtsclaw et al. |
| 2016/0137904 A1 | 5/2016 | Drake |
| 2016/0177674 A1 | 6/2016 | Shetty et al. |
| 2016/0208591 A1 | 7/2016 | Weaver et al. |
| 2016/0215202 A1 | 7/2016 | Weaver et al. |
| 2016/0215205 A1 | 7/2016 | Nguyen |
| 2016/0256583 A1 | 9/2016 | Yamada |
| 2016/0265331 A1 | 9/2016 | Weng et al. |
| 2016/0289543 A1 | 10/2016 | Chang et al. |
| 2016/0362965 A1 | 12/2016 | Parlar et al. |
| 2017/0015895 A1 | 1/2017 | Cox |
| 2017/0051598 A1 | 2/2017 | Ouenes |
| 2017/0066959 A1 | 3/2017 | Hull et al. |
| 2017/0066962 A1 | 3/2017 | Ravi et al. |
| 2017/0067836 A1 | 3/2017 | Hull et al. |
| 2017/0137703 A1 | 5/2017 | Leverson et al. |
| 2017/0145303 A1 | 5/2017 | Fontenelle et al. |
| 2017/0145793 A1 | 5/2017 | Ouenes |
| 2017/0198207 A1 | 7/2017 | Li et al. |
| 2017/0247997 A1 | 8/2017 | Kovalevsky |
| 2017/0275525 A1 | 9/2017 | Koep et al. |
| 2017/0328179 A1 | 11/2017 | Dykatra et al. |
| 2017/0336528 A1 | 11/2017 | Badri et al. |
| 2017/0370197 A1 | 12/2017 | Han et al. |
| 2018/0037810 A1 | 2/2018 | Han et al. |
| 2018/0112126 A1 | 4/2018 | Yang et al. |
| 2018/0155602 A1 | 6/2018 | Zhang |
| 2018/0155615 A1 | 6/2018 | Rahy et al. |
| 2018/0195982 A1 | 7/2018 | Hull et al. |
| 2018/0305208 A1 | 10/2018 | Mason |
| 2018/0355707 A1 | 12/2018 | Herrera et al. |
| 2019/0010795 A1 | 1/2019 | Cascio et al. |
| 2019/0017203 A1 | 1/2019 | Andoh et al. |
| 2019/0078424 A1 | 3/2019 | Copeland et al. |
| 2019/0211658 A1 | 7/2019 | Hull et al. |
| 2019/0292436 A1 | 9/2019 | Mason et al. |
| 2020/0048531 A1 | 2/2020 | Hull et al. |

FOREIGN PATENT DOCUMENTS

| | | | |
|---|---|---|---|
| CA | 2725088 A1 * | 1/2010 | ............. B01J 13/02 |
| CN | 101819111 | 12/2011 | |
| CN | 1621803 | 5/2012 | |
| CN | 103387827 | 11/2013 | |
| CN | 102183410 | 5/2014 | |
| CN | 105445440 | 3/2016 | |
| CN | 107057676 A * | 8/2017 | ......... C04B 33/1352 |
| CN | 105131934 | 12/2018 | |
| EP | 0247669 | 12/1987 | |
| EP | 2480625 | 4/2013 | |
| EP | 2480626 | 4/2013 | |
| WO | WO 1997028098 | 8/1997 | |
| WO | WO 2000060379 | 10/2000 | |
| WO | WO 2001094749 | 12/2001 | |
| WO | WO 2002064702 | 8/2002 | |
| WO | WO 2004005435 | 1/2004 | |
| WO | WO-2005021147 A2 * | 3/2005 | ......... B01D 67/0088 |
| WO | WO 2008001218 | 1/2008 | |
| WO | WO 2008018966 | 2/2008 | |
| WO | WO 2010041025 | 4/2010 | |
| WO | WO 2010138914 | 12/2010 | |
| WO | WO 2011035292 | 3/2011 | |
| WO | WO 2011035294 | 3/2011 | |
| WO | WO 2012051647 | 4/2012 | |
| WO | WO 2012057910 | 5/2012 | |
| WO | WO 2012087887 | 6/2012 | |
| WO | WO 2012087898 | 6/2012 | |
| WO | WO 2012104582 | 8/2012 | |
| WO | WO 2012122505 | 9/2012 | |
| WO | WO 2012171857 | 12/2012 | |
| WO | WO 2013052359 | 4/2013 | |
| WO | WO 2013112114 | 8/2013 | |
| WO | WO 2013149122 | 10/2013 | |
| WO | WO 2013154926 | 10/2013 | |
| WO | WO 2013155061 | 10/2013 | |
| WO | WO 2014008598 | 1/2014 | |
| WO | WO 2014123672 | 8/2014 | |
| WO | WO 2015041664 | 3/2015 | |
| WO | WO 2015041669 | 3/2015 | |
| WO | WO 2015097116 | 7/2015 | |
| WO | WO 2015126082 | 8/2015 | |
| WO | WO 2015163858 | 10/2015 | |
| WO | WO 2015181028 | 12/2015 | |
| WO | WO 2015200060 | 12/2015 | |
| WO | WO 2016089813 | 6/2016 | |
| WO | WO 2016094153 | 6/2016 | |
| WO | WO 2017035371 | 3/2017 | |
| WO | WO 2017040824 | 3/2017 | |
| WO | WO 2017040834 | 3/2017 | |
| WO | WO 2017086975 | 5/2017 | |
| WO | WO 2017136641 | 8/2017 | |
| WO | WO 2017161157 | 9/2017 | |
| WO | WO 2018025010 | 2/2018 | |
| WO | WO 2018045290 | 3/2018 | |
| WO | WO 2018081477 | 5/2018 | |
| WO | WO 2018118024 | 6/2018 | |
| WO | WO 2018170065 | 9/2018 | |

OTHER PUBLICATIONS

Abad et al., "Evaluation of the Material Properties of the Multilayered Oxides formed on HCM12A using New and Novel Techniques," Manuscript Draft, Manuscript No. OX1D-D-15-00019, 2015, 44 pages.

Abass et al., "Wellbore Instability of Shale Formation, Zuluf Field, Saudi Arabia," Society of Petroleum Engineers (SPE), presented at the SPE Technical Symposium on Saudi Arabia Section, Dhahran, Saudi Arabia, May 21-23, 2006, 10 pages.

Abousleiman and Nguyen, "Poromechanics Response of Inclined Wellbore Geometry in Fractured Porous Media," Journal of Engineering Mechanics, ASCE, Nov. 2005, 131:11, 14 pages.

Abousleiman et al, "A Micromechanically Consistent Poroviscoelasticity Theory for Rock Mechanics Applications," Int. J. Rock Meeh. Min. Sci. & Geomech. Abstr., 1993, 30:7 (1177-1180), 4 pages.

Abousleiman et al, "Anisotropic Porothermoelastic Solution and Hydro-Thermal Effects on Fracture Width in Hydraulic Fracturing," International Journal for Numerical and Analytical Methods in Geomechanics, 2013, 25 pages.

Abousleiman et al, "Geomechanics Field and Laboratory Characterization of Woodford Shale: The Next Gas Play," SPE 110120, Society of Petroleum Engineers (SPE), presented at the 2007 SPE Annual Technical Conference and Exhibition on Nov. 11-14, 2007, 14 pages.

Abousleiman et al, "Poroviscoelastic Analysis of Borehole and Cylinder Problems," ACTA Mechanica, 1996, 119: 199-219, 21 pages.

Abousleiman et al, "The Granular and Polymer Nature of Kerogen Rich Shale," Acta Geotechnica 2016, 11:3 (573-594), 24 pages.

Abousleiman et al., "GeoGenome Industry Consortium (G2IC)," JIP, 2004-2006, 6 pages.

Abousleiman et al., "GeoMechanics Field Characterization of the Two Prolific U.S. Mid-West Gas Plays with Advanced Wire-Line Logging Tools," SPE 124428, Society of Petroleum Engineers (SPE), presented at the 2009 SPE Annual Technical Conference and Exhibition, Oct. 4-7, 2009, 19 pages.

Abousleiman et al., "Geomechanics Field Characterization of Woodford Shale and Barnett Shale with Advanced Logging Tools and Nano-indentation on Drill Cuttings," The Leading Edge, Special Section: Borehole Geophysics, Jun. 2010, 6 pages.

(56) References Cited

OTHER PUBLICATIONS

Abousleiman et al., "Mandel's Problem Revisited," Geotechnique, 1996, 46:2 (187-195), 9 pages.
Abousleiman et al., "Mechanical Characterization of Small Shale Samples subjected to Fluid Exposure using the Inclined Direct Shear Testing Device," International Journal of Rock Mechanics and Mining Sciences, 2010, 47:3 (355-367), 13 pages.
Abousleiman et al., "Modeling Real-Time Wellbore Stability within the Theory of Poromechanics," AADE-03-NTCE-11, American Association of Drilling Engineers (AADE), presented at the AADE 2003 National Technology Conference, Practical Soultions for Drilling Challenges, Texas, Apr. 1-3, 2003, 14 pages.
Abousleiman et al., "Poroelastic Solutions in Transversely Isotropic Media for Wellbore and Cylinder," Int. J. Solids Structures, 1998, 35:34-35 (4905-4929), 25 pages.
Abousleiman et al., "Time-Dependent wellbore (in)stability predictions: theory and case study," IADC/SPE 62796, International Association of Drilling Contractors (IADC), Society of Petroleum Engineers (SPE), presented at the 2000 IADC/SPE Asia Pacific Drilling Technology held in Kuala Lumur, Malaysia, Sep. 11-13, 2000, 8 pages.
Agenet et al., "Fluorescent Nanobeads: a First Step Toward Intelligent Water Tracers," SPE 157019, Society of Petroleum Engineers (SPE), SPE International Oilfield Nanotechnology Conference, Jun. 12-14, 2012, 13 pages.
Agilent Technologies, "Field-Deployable Solution for Nanoporosity Measurements in Mud Logging Operations and a Novel Method for Fracability Analysis Using Mud Cuttings," Gulf Coast Conference, Agilent Restricted, Oct. 2013, 44 pages.
Ahmed et al. "7.2.2 Information Required to Move to a Pilot Project," Unconventional Resources Exploitation and Development, 2016, 1 page.
Allan et al., "A Multiscale Methodology for the Analysis of Velocity Anisotropy in Organic-Rich Shale," Geophysics, Jul.-Aug. 2015, 80:4 (C73-C88), 16 pages.
Al-Munthasheri, "A Critical Review of Hydraulic Fracturing Fluids over the Last Decade," SPE 169552, Society of Petroleum Engineers (SPE), presented at the SPE Western North American and Rocky Mountain Joint Regional Meeting, Apr. 16-18, 2014, 25 pages.
Altowairqi, "Shale elastic property relationships as a function of total organic carbon content using synthetic samples," Journal of Petroleum Science and Engineering, Sep. 2015, 133: 392-400, 9 pages.
Ananthan et al., "Influence of Strain Softening on the Fracture of Plain Concrete Beams," International Journal of Fracture, 1990, 45: 195-219, 25 pages.
Anisimov, "The Use of Tracers for Reservoir Characterization," SPE 118862, Society of Petroleum Engineers (SPE), presented at SPE Middle East Oil and Gas Show and Conference, Mar. 15-18, 2009, 8 pages.
Arns et al., "Computation of linear elastic properties from microtomographic images: Methodology and agreement between theory and experiment," Geophysics, Sep. 1, 2002, 67:5 (1396-1405), 10 pages.
Aslan et al., "Fluorescent Core—Shell AG@SiO$_2$ Nanocomposites for Metal-Enhanced Fluorescence and Single Nanoparticle Sensing Platforms," American Chemical Society (ACS), J. Am. Chem. Soc., JACS Communications, Jan. 19, 2007, 129: 1524-1525, 2 pages.
Ballice, "Solvent Swelling Studies of Goynuk (Kerogen Type-I) and Beypazari Oil Shales (Kerogen Type-II)," Science Direct, 2003, Fuel 82: 1317-1321, 5 pages.
Barati and Liang, "A Review of Fracturing Fluid Systems Used for Hydraulic Fracturing of Oil and Gas Wells," Journal of Applied Polymer Science, Aug. 15, 2014, 131:16, 11 pages.
Barenblatt et al., "Basic Concepts in the Theory of Seepage of Homogeneous Liquids in Fissured Rocks (Strata)," PMM 1960, 24:5 (852-864), 18 pages.

Bazant et al., "Deformation of Progressively Cracking Reinforced Concrete Beams," ACI Materials Journal, Technical Paper, Title No. 81-26, May-Jun. 1984, 81:3, 11 pages.
Bazant et al., "Size Effect in Brazilian Split-Cylinder Tests: Measurements and Fracture Analysis," ACI Materials Journal, Technical Paper, Title No. 88-M40, May 31, 1991, 88:3 (325-332), 8 pages.
Bazant et al., "Strain-Softening Bar and Beam: Exact Non-Local Solution," Int. J. Solids Structures, 1988, 24:7 (659-673), 15 pages.
Bennett et al., "Instrumented Nanoindentation and 3D Mechanistic Modeling of a Shale at Multiple Scales," Acta Geotechnica, 10:21, Jan. 9, 2015, 14 pages.
Berryman, "Extension of Poroelastic Analysis to Double-Porosity Materials: New Technique in Microgeomechanics," Journal of Engineering Mechanics, 128:8 (840), Aug. 2002, 8 pages.
Bhandari et al., "Two-Dimensional DEM Analysis of Behavior of Geogrid-Reinforced Uniform Granular Bases under a Vertical Cyclic Load," Acta Geotechnica, Research Paper, 2015, 10: 469-480, 12 pages.
Biot et al., "Temperature analysis in hydraulic fracturing," Journal of Petroleum Technology, 39:11, Nov. 1987, 9 pages.
Biot, "General Theory of Three-Dimensional Consolidation," the Ernest Kempton Adams Fund for Physical Research of Columbia University, Reprint Series, Journal of Applied Physics, 12:2 (155-164), Feb. 1941, 11 pages.
Bisnovat et al., "Mechanical and petrophysical behavior of organic-rich chalk from the Judea Plains, Israel," Marine and Petroleum Geology, 64: 152-164, Jun. 2015, 13 pages.
Bobko et al., "The Nanogranular Origin of Friction and Cohesion in Shale—A Strength Homogenization Approach to Interpretation of Nanoindentation Results," International Journal For Numerical and Analytical Methods in Geomechanics, 2010, 23 pages.
Boskey et al., "Perspective—Collagen and Bone Strength," Journal of Bone and Mineral Research, 14:3, Nov. 3, 1999, 6 pages.
Bratton et al., "The Nature of Naturally Fractured Reservoirs," Oilfield Review, Jun. 2006, 21 pages.
Brochard et al., "Fracture Properties of Kerogen and Importance for Organic-Rich Shales," Annual World Conference on Carbon (Carbon 2013), Jul. 2013, Rio de Janeiro, Brazil, HSL IF: hal-01274161, 6 pages.
Brochard et al., "Fracture Properties of Kerogen and Importance for Organic-Rich Shales," Annual World Conference on Carbon (Carbon 2013), Jul. 2013, 5 pages.
Bunzil et al., "Taking Advantage of Luminescent Lanthanide Ions," Chemical Society Reviews (CSR), Critical Review, 34: 1048-1077, Dec. 2005, 30 pages.
Caenn et al., "Chapter 9: Wellbore Stability," p. 359, in Composition and Properties of Drilling and Completion Fluids, 7th Edition: Gulf Professional Publishing, 2016, 1 page.
Cahill et al., "Nanoscale Thermal Transport II," Applied Physics Reviews 1.1:011305, 2014, 46 pages.
Cahill et al., "Nanoscale Thermal Transport," Journal of Applied Physics 93:2, Jan. 15, 2003, 28 pages.
California Council on Science and Technology Lawrence Berkeley National Laboratory Pacific Institute, "Advanced Well Stimulation Technologies in California: An Independent Review of Scientific and Technical Information," CCST, Jul. 2016, 400 pages.
Carcione and Avseth, "Rock-physics templates for clay-rich source rocks," Geophysics 80:5 (D481-D500), Sep. 2015, 21 pages.
Carter and Hanson, "Fake Moon Dirt, HOOD Solar System Science," UT Dallas Magazine, 6:2, Spring 2016, 1 page.
Chang et al., "Magnetic SERS Composite Nanoparticles for Microfluidic Detection," abstract to 251st ACE National Meeting, Mar. 13-17, 2016, 1 page (abstract).
Chang, "In-Situ Formation of Proppant and Highly Permeable Blocks for Hydraulic Fracturing," SPE-173328-MS, Society of Petroleum Engineers (SPE), SPE Hydraulic Fracturing Technology Conference Feb. 3-5, 2015, 11 pages.
Chen et al., "Size Effect in Micro-Scale Cantilever Beam Bending," Acta Mech., 219: 291-307, 2011, 17 pages.
Chen et al., "FITC functionalized magnetic core-shell Fe$_3$O$_4$/Ag hybrid nanoparticle for selective determination of molecular biothiols," Sensorsand Actuators B: Chemical, 193: 857-863, Dec. 2013, 7 pages.

(56) References Cited

OTHER PUBLICATIONS

Chern et al., "Deformation of Progressively Cracking Partially Prestressed Concrete Beams," PCI Journal, 37:1 (74-84), 1992, 11 pages.

Cheshomi et al., "Determination of uniaxial compressive strength of microcystalline limestone using single particles load test," Journal of Petroleum Science and Engineering, 111: 121-126, 2013, 6 pages.

Chuang et al., "Ultra-sensitive in-situ detection of novel near-infrared persistent luminescent tracer nanoagents in crude oil-water mixtures," a natureresearch journal, Scientific Reports, Jun. 15, 2016, 5 pages.

Chupin et al., "Finite Strain Analysis of Nonuniform Deformation Inside Shear Bands in Sands," International Journal for Numerical and Analytical Methods in Geomechanics, 36: 1651-1666, 2012, 16 pages.

Corapcioglu, "Fracturing Fluid Effects on Young's Modulus and Embedment in the Niobrara Formation," Thesis for degree of Master of Science (Petroleum Engineering), Colorado School of Mines, 2014, 189 pages.

Cubillos et al., "The Value of Inter-well and Single Well Tracer Technology for De-Risking and Optimizing a CEOR Process—Caracara Field Case," SPE 174394-MS, Society of Petroleum Engineers (SPE), presented at EUROPEC 2015, Jun. 1-4, 2015, 19 pages.

Cui et al., "Poroelastic solution for an inclined borehole," Transactions of the ASME, Journal of Applied Mechanics, 64, Mar. 1997, 7 pages.

Custelcean et al., "Aqueous Sulfate Separation by Crystallization of Sulfate-Water Clusters," Angewandte Chemie, International Edition, 2015, 54: 10525-10529, 5 pages.

Dagan, "Models of Groundwater Flow in Statistically Homogeneous Porous Formations," Water Resource Search 15:1, Feb. 1979, 17 pages.

Daneshy, "Hydraulic Fracturing to Improve Production," Tech 101, TheWayAhead, 6:3, Oct. 2010, 4 pages.

Das et al., "Molecular Fluorescence, Phosphorescence, and Chemiluminescence Spectrometry," American Chemical Society Publications (ACS), Analytical Chemistry, 84: 597-625, Nov. 3, 2011, 29 pages.

De Block et al., "A New Solution for the Characterization of Unconventional Shale Resources Based on Analysis or Drill Cutting," SPE-177601-MS, Society of Petroleum Engineers (SPE), presented at the Abu Dhabi International Petroleum Exhibition and Conference, Nov. 9-12, 2015, 6 pages.

De Rocha et al, "Concentrated CO2-in-Water Emulsions with Nonionic Polymeric Surfactants," Journal of Colloid and Interface Science, 2001, 239:1 (241-253), 13 pages.

Deans, "Using Chemical Tracers To Measure Fractional Flow And Saturation In-Situ," SPE 7076, Society of Petroleum Engineers (SPE) of AIME, presented at Fifth Symposium on Improved Methods for Oil Recovery of the Society of Petroleum Engineers of AIME, Apr. 16-19, 1978, 10 pages.

Deirieh et al., "Nanochemomechanical Assessment of Shale: A Coupled WDS-Indentation Analysis," Acta Geotechnica, Research Paper, Sep. 2012, 25 pages.

Delafargue and Ulm, "Explicit approximations of the indentation modulus of elastically orthotropic solids for conical indenters," International Journal of Solids and Structures 41:26 (7351-7360), Dec. 2004, 10 pages.

Detoumay and Cheng, "Poroelastic Response of a Borehole in a Non-Hydrostatic Stress Field," International Journal of Rock Mechanics, Min. Science and Geomech. Abstracts, 25:3, 1988, 12 pages.

Devarapalli et al., "Micro-CT and FIB-SEM imaging and pour structure characterization of dolomite rock at multiple scales," Arabian Journal of Geosciences 10:361, Aug. 2017, 9 pages.

Du et al., "Interwell Tracer Tests: Lessons Learned from past Field Studies," SPE 93140, Society of Petroleum Engineers (SPE), presented at SPE Asia Pacific Oil and Gas Conference and Exhibition, Apr. 5-7, 2005, 9 pages.

Eastoe et al, "Water-in-CO2 Microemulsions Studied by Small-Angle Neutron Scattering," Langmuir 1997, 13:26 (6980-6984), 5 pages.

Ehlig-Economides and Economides, "Water as Poppant," SPE-147603, Society of Petroleum Engineers (SPE), presented at the SPE Annual Technical Conference and Exhibition, Oct. 30-Nov. 2, 2011, 8 pages.

Ekbote et al., "Porochemoelastic Solution for an Inclided Borehole in a Transversely Isotropic Formation," Journal of Engineering Mechanics, ASCE, Jul. 2006, 10 pages.

El-Aneed et al., "Mass Spectrometry, Review of the Basics: Electrospray, MALDI, and Commonly Used Mass Analyzers," Applied Spectroscopy Reviews 44:3 (210-230), Mar. 16, 2009, 22 pages.

Elijah, "Numerical Modeling of Wellbore Instability (Tensile Failure) Using Fracture Mechanics Approach," Thesis for the degree of Master of Science, African University of Science and Technology Abuja, May 2013, 77 pages.

Eliyahu et al, "Mechanical Properties of organic matter in shales mapped at the nanometer scale," Marine and Petroleum Geology, 59:294-304, Sep. 18, 2014, 11 pages.

Ertas et al., "Petroleum Expulsion Part 1. Theory of Kerogen Swelling in Multicomponent Solvents," Energy & Fuels, 20: 295-300, 2006, 6 pages.

Eseme et al., "Review of mechanical properties of oil shales: implications for exploitation and basin modeling," Oil Shale 24:2 (159-174), Jan. 2007, 16 pages.

Esfahani et al., "Quantitative nanoscale mapping of three-phase thermal conductivities in filled skutterudites via scanning thermal microscopy," Nature Science Review 5:1, Feb. 2017, 31 pages.

Ewy, "Shale Swelling/Shrinkage and Water Content Change due to Imposed Suction and Due to Direct Brine Contact," Acta Geotechnica, 9: 869-886, 2014, 18 pages.

Ewy, "Wellbore-Stability Predictions by Use of a Modified Lade Criterion," SPE Drill and Completion, 14:2, Jun. 1999, 7 pages.

Fekete.com [online], "Dual Porosity," retrieved from URL <www.fekete.com/SAN/WebHelp/FeketeHarmony/Harmony_WebHelp/Content/HFML_Files/Reference_Material/General_Concepts/Dual_Porosity.htm>, available on or before 2014, retrieved on Nov. 11, 2019, 6 pages.

Fjaer et al., "Stresses around Boreholes. Borehole Failure Criteria," in Petroleum Related Rock Mechanics, 2nd Edition, 2008, 156, 1 page.

Frazer et al., "Localized Mechanical Property Assessment of SiC/SiC Composite Materials," Science Direct, Composites: Part A, 70: 93-101, 2015, 9 pages.

Gallegos and Varela, "Trends in Hydraulic Fracturing Distributions and Treatment Fluids, Additives, Proppants, Water Volumes Applied to Wells Drilled in the United States from 1947 through 2010—Data Analysis and Comparison to the Literature," USGS, United States Geological Survey, 2015, 24 pages.

Gandossi and Estorff, "An overview of hydraulic fracturing and other formation stimulation technologies for shale gas production," JRC Science for Policy Report, European Commission, EUR 26347 EN, Jan. 2013, 62 pages.

Ganjdanesh et al. "Treatment of Condensate and Water Blocks in Hydraulic-Fractured Shale-Gas/Condensate Reservoirs," SPE-175145, Society of Petroleum Engineers (SPE), presented at the SPE Annual Technical Conference and Exhibition, Sep. 28-30, 2015, SPE Journal, Apr. 2016, 10 pages.

Gao et al., "Materials Become Insensitive to Flaws at Nanoscale: Lessons from Nature," PNAS, 100:10, May 13, 2003, 4 pages.

Gardiner et al., "Chapter 1: Introduction to Raman Scattering," in Practical Raman Spectroscopy, Springer-Verlag, 1989, 9 pages.

Garnero, "The Contribution of Collagen Crosslinks to Bone Strength," Int. Bone & Mineral Society, BoneKEy Reports 1:182, Sep. 2012, 8 pages.

George et al., "Approximate relationship between frequency-dependent skin depth resolved from geoelectronnagnetic pedotransfer function and depth of investigation resolved from geoelectrical measurements: A case study of coastal formation, southern Nigeria," Journal of Earth Syst. Sci, 125:7 (1379-1390), Oct. 2016, 12 pages.

(56) References Cited

OTHER PUBLICATIONS

Georgi et al., "Physics and Chemistry in Nanoscale Rocks," Society of Petroleum Engineers (SPE), SPE Forum Series, Frontiers of Technology, Mar. 22-26, 2015, 4 pages.

Glossary.oilfield.slb.com [online], "Oilfield Glossary: fluid-friction reducer," available on or before Jun. 15, 2017, retrieved from URL< http://www.glossary.oilfield.slb.com/Terms/f/fluid-friction_reducer.aspx>, 1 page.

Glover et al., "The Use of Measurements Made on Drill Cuttings to Construct and Apply Geomechanical Well Profiles," ARMA 16-0737, American Rock Mechanics Association (ARMA), presentation at the 50th US Rock Mechanics/Geomechanics Symposium, Jun. 26-29, 2016, 11 pages.

Golomb et al, "Macroemulsion of liquid and supercritical CO2-in-water and water-in-liquid CO2 stabilized with fine particles," American Chemical Society (ACS), Ind. Eng. Chem. Res. 2006, 45:8 (2728-2733), 6 pages.

Goodman, "Chapter 3: Rock Strength and Failure Criteria," in Introduction to Rock Mechanics, John Wiley & Sons, 1989, 21 pages.

Gu and Mohanty, "Effect of Foam Quality on Effectiveness of Hydraulic Fracturing in Shales," International Journal of Rock Mechanics and Mining Sciences, 70: 273-285, 2014, 13 pages.

Han and Cundall, "LBM-DEM modeling of fluid-solid interaction in porous media," International Journal for Numerical and Analytical Methods in Geomechanics, 37:10 (1391-1407), Jul. 2013, 17 pages.

Han et al., "Numerical and Experimental Studies of Kerogen Rich Shales on Millimeter-Scale Single-Edge Notched Beam," ARMA-19-211, American Rock Mechanics Association (ARMA), prepared for presentation at the 53rd US Rock Mechanics and Geomechanics Symposium in New York, Jun. 23-26, 2019, 8 pages.

Han et al., "Numerical Modeling of Elastic Spherical Contact for Mohr-Coulomb Type Failures in Micro-Geomaterials," Experimental Mechanics, 57: 1091-1105, Jun. 16, 2017, 15 pages.

Han et al., "Application of Silver-Coated Magnetic Microspheres to a SERS-Based Optofluidic Sensor," American Chemical Society Publications (ACS), the Journal of Physical Chemistry C (JPCC), 115: 6290-6296, Mar. 7, 2011, 7 pages.

Harrison et al, "Water-in-Carbon Dioxide Microemulsions with a Fluorocarbon-Hydrocarbon Hybrid Surfactant," Langmuir 1994, 10:10 (3536-3541), 6 pages.

Hiramatsu and Oka, "Stress around a shaft or level excavated in ground with a three-dimensional stress state," Mem. Fra. Eng. Kyoto Univ. 24, 1962, 2 pages (Abstract).

Hoang et al., "Correspondence Principle Between Anisotropic Poroviscoelasticity and Poroelasticity using Micromechanics and Application to Compression of Orthotropic Rectangular Strips," Journal of Applied Physics, American Institute of Physics, 112: 044907, Aug. 30, 2012, 16 pages.

Hoek and Brown, "Empirical Strength Criterion for Rock Masses," Journal of the Geotechnical Engineering Division, Sep. 1980, 20 pages.

Hornby et al., "Anisotropic Effective-Medium Modeling of the Elastic Properties of Shales," Geophysics, 59:10 (1570-1583), Oct. 1994, 14 pages.

Hosemann et al, "Mechanical Characteristics of SiC Coating Layer in TRISO Fuel Particles," Journal of Nuclear Materials, 442: 133-142, 2013, 10 pages.

Hosemann et al., "An Exploratory Study to Determine Applicability of Nano-Hardness and Micro-compression Measurements for Yield Stress Estimation," Science Direct, Journal of Nuclear Materials, 375: 135-143, 2008, 9 pages.

Hu et al., "Smart Liquid SERS Substrates based on $Fe_3O_4$/Au Nanoparticles with Reversibility Tunable Enhancement Factor for Practical Quantitative Detection," a natureresearch journal, Scientific Reports, 4:7204, Nov. 27, 2014, 10 pages.

Hull and Abousleiman, "Chapter 10: Insights of the Rev of Source Shale from Nano-and Micromechanics," in New Frontiers in Oil and Gas Exploration, Springer International Publishing Switzerland, 2016, 29 pages.

Hull et al, "Nanomechanical Characterization of the Tensile Modulus of Rupture of Kerogen-Rich Shale," SPE 177628, Society of Petroleum Engineers (SPE), presented at the Abu Dhabi International Petroleum Exhibition and Conference, Nov. 9-12, 2015, SPE Journal 2017, 22:4 (1024-1033), 10 pages.

Hull et al., "Recent Advances in Viscoelastic Surfactants for improved Production from Hydrocarbon Reservoirs," SPE 173776, Society of Petroleum Engineers (SPE), presented at the SPE International Symposium on Oilfield Chemistiy, Apr. 13-15, 2015, SPE Journal, 2016, 18 pages.

Huseby et al., "High Quality Flow Information from Tracer Data," SPE-169183-MS, Society of Petroleum Engineers (SPE), presented at the SPE Bergen One Day Seminar, Apr. 2, 2014, 9 pages.

Hutchins et al., "Aqueous Tracers for Oilfield Applications," SPE-21049, Society of Petroleum Engineers (SPE), presented at SPE International Symposium on Oilfield Chemistry, Feb. 20-22, 1991, 9 pages.

Iqbal et al., "In situ micro-cantilver tests to study fracture properties of NiAl single crystals," Acta Materialia, 60:3 (1193-1200), Feb. 2012, 8 pages.

Itascacg.com' [online], "Particle Flow Code, Version 5.0," Itasca Consulting Group, Inc., available on or before Apr. 11, 2014, [retrieved on May 11, 2018], retrieved from URL: <https://www.itascacg.com/software/pfc>, 5 pages.

Itascacg.com [online], "Three-dimensional Fast Lagrangian Analysis of Continua (FLAC3D)," available on or before 2012, [retrieved on Jun. 7, 2018], retrieved from URL: <https://www.itascacg.com/software/flac3d>, 4 pages.

Iyengar et al., "Analysis of Crack Propagation in Strain-Softening Beams," Engineering Fracture Mechanics 69: 761-778, 2002, 18 pages.

Jaeger et al., "Fundamentals of Rock Mechanics," 4th Edition, Wiley, 2007, 486 pages.

Jia et al., "Highly Efficient Extraction of Sulfate Ions with a Tripodal Hexaurea Receptor," Angew. Chem. Int. Ed., 2011, 50: 486-490, 5 pages.

Jianhong et al., "Estimation of the Tensile Elastic Modulus using Brazilian disc by Applying Diametrically Opposed Concentrated Loads," International Journal of Rock Mechanics & Mining Sciences 46:3 (568-576), 2009, 9 pages.

Johnston et al, "Water-in-Carbon Dioxide Microemulsions: An Environment for Hydrophiles Including Proteins," Science, 271:5249 (624-626), Feb. 2, 1996, 3 pages.

Jose et al., "Continuous multi cycle nanoindentation studies on compositionally graded $Ti_{1-x}Al_xN$ multilayer thin films," Materials Science and Engineering A, 528:21 (6438-6444), Apr. 20, 2011, 7 pages.

Jun et al., "Multifunctional Silver-Embedded Magnetic Nanoparticles as SERS Nanoprobes and Their Applications," Nano Micro Small, Multifunctional Nanoparticles, 6:1 (119-125), Jan. 4, 2010, 7 pages.

Kang et al., "An experimental study on oxidizer treatment used to improve the seepage capacity of coal reservoirs," Natural Gas Industry B, 6: 129-137, Sep. 25, 2018, 9 pages.

Kelemen et al., "Petroleum Expulsion Part 2. Organic Matter Type and Maturity Effects on Kerogen Swelling by Solvents and Thermodynamic Parameters for Kerogen from Regular Solution Theory," Energy & Fuels 20: 310-308, 2006, 8 pages.

Kethireddy, "Quantifying the effect of kerogen on Electrical Resistivity Measurements in Organic Rich Source Rocks," Thesis in partial fulfillment of the requirements for the degree of Master of Science, Dec. 2013, 78 pages.

Kim et al., "Numerical analysis of fracture propagation during hydraulic fracturing operations in shale gas systems," International Journal of Rock and Mechanics Mining Sciences, 76: 127-137, 2015, 11 pages.

King, "Thirty Years of Gas Shale Fracturing: What Have We Learned?" SPE-133456, Society of Petroleum Engineers (SPE), presented at the SPE Annual Technical Conference and Exhibition, Sep. 19-22, 2010, 50 pages.

(56) References Cited

OTHER PUBLICATIONS

Klapetek, "Chapter 11: Thermal Measurements," in Quantitative Data Processing in Scanning Probe Microscopy: SPM Applications for Nanometrology, 2018, 26 pages.

Kneipp et al., "Single Molecule Detection Using Surface-Enhanced Raman Scattering (SERS)," Physical Review Letters, American Physical Society 78:9, Mar. 3, 1997, 4 pages.

Kolymbas, "Kinematics of Shear Bands," Acta Geotechnica, 4: 315-318, 2009, 4 pages.

Kumar et al., "Nano to Macro Mechanical Characterization of Shale," SPE 159804, Society of Petroleum Engineers (SPE), presented at the SPE Annual Technical Conference and Exhibition, Oct. 8-10, 2012, 23 pages.

Kuperkar et al., "Visoelastic micellar water/CTAB/NaNO3 Solutions: Reology, SANS and cyro-TEM Analysis," Journal of Colloid and Interface Science, 323: 403-409, 2008, 7 pages.

Lam et al., "Experiments and Theory in Strain Gradient Elasticity," Journal of Mechanics and Physics of Solids, 51: 1477-1508, 2003, 32 pages.

Larsen et al., "Changes in the Cross-Link Density of Paris Basin Toarcian Kerogen During Maturation," Organic Geochemistry 33: 1143-1152, 2002, 10 pages.

Lee et al, "Water-in carbon dioxide emulsions: Formation and stability," Langmuir, 1999, 15:20 (6781-6791), 11 pages.

Li et al., "A review of crosslinked fracturing fluids prepared with produced water," KeAi Advanced Research Evolving Science, Southwest Petroleum University, Petroleum 2, 2:4 (313-323), Dec. 2016, 11 pages.

Li et al., "Differentiating Open Natural Fractures from Healed Fractures Using the New, High-Definition Oil-Based Mud Microelectrical Imager-Case Studies from Organic Rich Shales," SPE-174923-MS, Society of Petroleum Engineers (SPE), presented at the SPE Annual Technical Conference and Exhibition, Sep. 28-30, 2015, 16 pages.

Li et al., "High-Temperature Fracturing Fluids Using Produced Water with Extremely High TDS and Hardness," IPTC-17797-MS, International Petroleum Technology Conference (IPTC), presented at the International Petroleum Technology Conference, Dec. 10-12, 2014, 13 pages.

Li et al., "Mechanical Characterization of Micro/Nanoscale Structures for MEMS/NEMS Applications using Nanoindentation Techniques," Science Direct, Ultramicroscopy, 97: 481-494, 2003, 14 pages.

Li et al., "The Brazilian Disc Test for Rock Mechanics Applications: Review and New Insights," Rock Meeh Rock Eng, 2013, 46: 269-287, 19 pages.

Li et al., "Well Treatment Fluids Prepared With Oilfield Produced Water: Part II," SPE-133379-MS, Society of Petroleum Engineers (SPE), presented at the SPE Annual Technical Conference and Exhibition, Sep. 19-22, 2010, 7 pages.

Liang et al., "An Experimental Study on interactions between Imbibed Fractured Fluid and Organic-Rich Tight Carbonate Source Rocks," SPE-188338-MS, Society of Petroleum Engineers (SPE), presented at the Abu Dhabi International Petroleum Exhibition and Conference, Nov. 13-16, 2017, 14 pages.

Liu and Abousleiman, "Multiporosity/Multipermeability Inclined-Wellbore Solutions with Mudcake Effects," Society of Petroleum Engineers (SPE), SPE Journal 23:5, Oct. 2018, 25 pages.

Liu and Abousleiman, "N-Porosity and N-Permeability generalized wellbore stability analytical solutions and applications," ARMA 16-417, America Rock Mechanics Association (ARMA), presented at the 50th US Rock Mechanics/Geomechanics Symposium held in Houston, Texas, Jun. 26-29, 2016, 10 pages.

Liu et al., "Applications of nano-indentation methods to estimate nanoscale mechanical properties of shale reservoir rocks," Journal of Natural Gas Science and Engineering, 35: 1310-1319, Sep. 29, 2016, 10 pages.

Liu et al., "Microstructural and geomechanical analysis of Bakken shale at nanoscale," Journal of Petroleum Science and Engineering, 153: 138-144, Mar. 23, 2017, 12 pages.

Liu et al., "Poroelastic Dual-Porosity/Dual-Permeability After-Closure Pressure-Curves Analysis in Hydraulic Fracturing," SPE 181748, Society of Petroleum Engineers (SPE), SPE Journal 2016, 21 pages.

Liu et al., "Safe Drilling in Chemically Active and Naturally Fractured Source Rocks: Analytical Solution and Case Study," IADC/SPE-189658-MS, Society of Petroleum Engineers (SPE), IADC, presented at the IADC/SPE Drilling Conference and Exhibition, Mar. 6-8, 2018, 13 pages.

Liu, "Dimension effect on mechanical behavior of silicon micro—cantilver beams," Measurement, 41:8 (885-895), Oct. 2008, 11 pages.

Liu, "Elastic Constants Determination and Deformation Observation Using Brazilian Disk Geometiy," Experimental Mechanics, 2010, 50: 1025-1039, 15 pages.

Liu, "Fracture Toughness Assessment of Shales by Nanoindentation," Thesis for the degree of Master of Science in Civil Engineering, Geotechnical Engineering Masters Projects, University of Massachusetts Amherst, Sep. 2015, 80 pages.

Liu, "Micro-cantilver Testing to Evaluate the Mechanical Properties of Thermal Barrier Coatings," presented at the 19th European Conference on Fracture (ECF19): Fracture Mechanics for Durability, Reliability and Safety, Conference Proceedings, Aug. 26-31, 2012, 7 pages.

Long et al., "Chapter 2: Advanced Well Stimulation Technologies," in An Independent Scientific Assessment of Well Stimulation in California, vol. I, Well Stimulation Technologies and their Past, Present and Potential Future Use in California, Jan. 2015, 62 pages.

Low, "Advances in Ceramics Matrix Composites," Processing. Properties and applications of SiCl/SiC, 10-19, Nanoceramic Matric Composites, 30-41, 2014, 11 pages.

Low, "Ceramic-Matrix Composites: Microstructure, Properties and Applications," Woodhead Publishing Limited, 11-19, 30-40, 2006, 11 pages.

Lu et al, "Fabrication and characterization of ceramic coatings with alumina-silica sol-incorporated a-alumina powder coated on woven quartz fiber fabrics," Ceramics International 39:6 (6041-6050), Aug. 2013, 10 pages.

Luan et al., "Creation of synthetic samples for physical modelling of natural shale," European Association of Geoscientists and Engineers (EAGE), Geophysical Prospecting 64: 898-914, Jul. 2016, 17 pages.

Lyngra et al. "Heavy Oil Characterization: Lessons Learned During Placement of a Horizontal Injector at a Tar/Oil Interface," SPE-172673-MS, Society of Petroleum Engineers (SPE), presented at the SPE Middle East Oil & Gas Show and Conference, Mar. 8-11, 2015, 20 pages.

Mahabadi et al., "A novel approach for micro-scale characterization and modeling of geomaterials incorporating actual material heterogeneity," (XP002689941) Geophysical Research Letters 39:1 (L01303), Jan. 1, 2012, 6 pages.

Mahmoud et al., "Removal of Pyrite and Different Types of Iron Sulfide Scales in Oil and Gas Wells without H2S Generation," IPTC-18279-MS, International Petroleum Technology Conferences (IPTC), presented at the International Petroleum Technology Conference, Dec. 6-9, 2015, 8 pages.

Maio et al., "Measuring Fracture Toughness of Coatings using Focused-ion-beam-machined Microbeams," J. Mater. Res., 20:2, Feb. 2005, 4 pages.

Marchetti et al., "Fluorous affinity chromatography for enrichment and determination of perfluoroalkyl substances," American Chemical Society (ACS), Annual Review of Analytical Chemistiy 84: 7138-7145, Jul. 19, 2012, 8 pages.

Maxwell, "Microseismic hydraulic fracture imaging: The path toward optimizing shale gas production," The Leading Edge, Special Section: Shales, Mar. 2011, 6 pages.

McMahon et al., "First 100% Reuse of Bakken Produced Water in Hybrid Treatments Using Inexpensive Polysaccharide Gelling Agents," SPE-173783-MS, Society of Petroleum Engineers (SPE), presented at the SPE International Symposium on Oilfield Chemistry, Apr. 13-15, 2015, 9 pages.

Mehrabian and Abousleiman, "Generalized Biot's Theory an Mandel's Problem of Multiple Porosity and Multiple-Permeability Poroelastic-

(56) References Cited

OTHER PUBLICATIONS ity," American Geophysical Union (AGU), Journal of Geological Research: Solid Earth, 119:4 (2745-2763), 2014, 19 pages.

Mesa, "Spherical and rounded cone nano indenters," Micro Star Technologies Inc., available on or before Jan. 23, 2018, 24 pages.

Meyers et al., "Point load testing of drill cuttings from the determination of rock strength," ARMA-05-712, presented at the 40th U.S. Symposium on Rock Mechanics (USRMS), Alaska Rocks 2005, American Rock Mechanics Association, Jun. 25-29, 2005, 2 pages, (Abstract).

Middleton et al, "Shale gas and non-aqueous fracturing fluids: Opportunities and challenges for supercritical CO 2," Applied Energy, 147: 500-509, 2015, 10 pages.

Montgomery and Smith, "Hydraulic Fracturing: History of Enduring Technology," Journal of Petroleum Technology, Dec. 2010, 7 pages.

Montgomery, "Chapter 1: Fracturing Fluids," in Effective and Sustainable Hydraulic Fracturing, Intech, the proceedings of the International Conference for Effective and Sustainable Hydraulic Fracturing (HF2103) on May 20-22, 2013, 23 pages.

Montgomery, "Chapter 2: Fracturing Fluid Components," in Effective and Sustainable Hydraulic Fracturing, Intech, 2013, 21 pages.

Moyer, "A Case for Molecular Recognition in Nuclear Separations: Sulfate Separation from Nuclear Wastes," American Chemical Society (ACS), Inorganic Chemistry, 2012, 52: 3473-3490, 18 pages.

Moyner et al., "The Application of Flow Diagnostics for Reservoir Management," SPE 171557, Society of Petroleum Engineers (SPE), SPE Journal, Apr. 2015, 18 pages.

Nguyen and Abousleiman, "Poromechanics Response of Inclined Wellbore Geometry in Chemically Active Fractured Porous Media," Journal of Engineering Mechanics, 135:11, Nov. 2005, 14 pages.

Oliver and Pharr, "An improved technique for determining hardness and elastic modulus using load and displacement sensing indentation experiments," Journal of Materials Research, 7:6, Jun. 1992, 20 pages.

Oliver and Pharr, "Measurement of hardness and elastic modulus by instrumented indentation: Advances in understanding and refinements to methodology," Journal of Materials Research, 19:1, Jan. 2004, 18 pages.

Ortega et al., "The Effect of Particle Shape and Grain-Scale Properties of Shale: A Micromechanics Approach," International Journal for Numerical and Analytical Methods in Geomechanics, 34: 1124-1156, 2010, 33 pages.

Ortega et al., "The Effect of the Nanogranular Nature of Shale on their Poroelastic Behavior," Acta Geotechnica, 2: 155-182, 2007, 28 pages.

Ortega et al., "The Nanogranular Acoustic Signature of Shale," Geophysics, 74:3 (D65-D84), May-Jun. 2009, 20 pages.

Osman and Pao, "Mud Weight Prediction for Offshore Drilling," 8 pages.

Ottesen, "Wellbore Stability in Fractured Rock," IADC/SPE 128728, International Association of Drilling Contractors (IADC), Society of Petroleum Engineers (SPE), presented at the 2010 IADC/SPE Drilling Conference and Exhibition, Louisiana, Feb. 2-4, 2010, 8 pages.

Pant, "Nanoindentation characterization of clay minerals and clay-based hybrid bio-geomaterials," dissertation for degree of Doctor of Philosophy in the Department of Civil and Environmental Engineering at the Louisiana State University and Agricultural and Medical College, Dec. 2013, 111 pages.

Passey et al., "From Oil-Prone Source Rock to Gas-Producing Shale Reservoir—Geologic and Petrophysical Characterization of Unconventional Shale-Gas Reservoirs," SPE 131350, Society of Petroleum Engineers (SPE), presented at the CPS/SPE International Oil & Gas Conference and Exhibition, Jun. 8-10, 2010, 29 pages.

Patel et al., "Analysis of US Hydraulic Fracturing Fluid System and Proppant Trends," SPE 168645, Society of Petroleum Engineers (SPE), presented at the SPE Hydraulic Fracturing Technology Conference, Feb. 4-6, 2014, 20 pages.

Petoud et al., "Brilliant SM, Eu, Tb, and Dy Chiral Lanthanide Complexes with Strong Circularly Polarized Luminescence," Journal for the American Chemical Society (JACS), 129: 77-83, Dec. 15, 2006, 7 pages.

Petrowiki.org [online], "Fluid flow in naturally fractured reservoirs," retrieved from URL <https://petrowiki.org/Fluid_flow_in_naturally_fractured_reservoirs, available on or before Jul. 16, 2015, retrieved on Nov. 11, 2019, 12 pages.

Podio et al., "Dynamic Properties of Dry and Water-Saturated Green River Shale under Stress," SPE 1825, Society of Petroleum Engineers (SPE), presented at the SPE 42nd Annual Fall Meeting, Oct. 1-4, 1967, Society of Petroleum Engineers Journal, Jun. 11, 1968, 16 pages.

Pollard et al., "Fundamentals of Structural Geology," Cambridge University Press, Sep. 1, 2005, 291, 3 pages.

Pollock and Hammiche, "Micro-thermal analysis: techniques and applications," Journal of Physics D: Applied Physics, 34.9 (R23-R53), 2001, 31 pages.

Poon et al., "An Analysis of Nanoindentation in Linearly Elastic Solids," International Journal of Solids and Structures, 45:24 (6018-6033), Dec. 1, 2008, 16 pages.

Qin et al, "Applicability of nonionic surfactant alkyl poly glucoside in preparation of liquid CO2 emulsion," Journal of CO2 Utilization, 2018, 26: 503-510, 8 pages.

Rajbanshi et al., "Sulfate Separation from Aqueous Alkaline Solutions by Selective Crystallization of Alkali Metal Coordination Capsules," American Chemical Society Publications (ACS), Crystal Growth and Design, 2011, 11: 2702-2706, 5 pages.

Ribeiro and Sharma, "Fluid Selection for Energized Fracture Treatments," SPE 163867, Society of Petroleum Engineers (SPE), presented at the SPE Hydraulic Fracturing Technology Conference, Feb. 4-6, 2013, 11 pages.

Richard et al, "Slow Relaxation and Compaction of Granular Systems," Nature Materials, 4, Feb. 2005, 8 pages.

Rodriguez et al., "Imagining techniques for analyzing shale pores and minerals," National Energy Technology Laboratory, Dec. 2, 2014, 44 pages.

Rostami et al., "DABCO tribromide immobilized on magnetic nanoparticle as a recyclable catalyst for the chemoselective oxidation of sulfide using H2O2 under metaland solvent-free condition," Catal. Commun. 2014, 43: 16-20, 20 pages.

Rowan et al., "Dynamic Covalent Chemistry," Angewante Chemie International Edition, 41: 898-952, Mar. 15, 2002, 55 pages.

Ryoo et al, "Water-in-Carbon Dioxide Microemulsions with Methylated Branched Hydrocarbon Surfactants," Industrial & Engineering Chemistry Research 2003, 42:25 (6348-6358), 11 pages.

Sagisaka et al, "A New Class of Amphiphiles Designed for Use in Water-in-Supercritical CO2 Microemulsions," Langmuir 2016, 32:47 (12413-12422), 44 pages.

Sagisaka et al, "Effect of Fluorocarbon and Hydrocarbon Chain Lengths In Hybrid Surfactants for Supercritical CO2," Langmuir 2015, 31:27 (7479-7487), 36 pages.

Sagisaka et al, "Nanostructures in Water-in-CO2 Microemulsions Stabilized by Double-Chain Fluorocarbon Solubilizers," Langmuir 2013, 29:25 (7618-7628), 11 pages.

Santarelli et al., "Drilling through Highly Fractured Formations: A Problem, a Model, and a Cure," Society of Petroleum Engineers (SPE), presented at the 67th Annual Technical Conference and Exhibition of the Society of Petroleum Engineers, Washington D.C., Oct. 4-7, 1992, 10 pages.

Sayed and Al-Muntasheri, "A Safer Generation of Wettability Alteration Chemical Treatments," SPE-184566-MS, Society of Petroleum Engineers (SPE), presented at the SPE International Conference on Oilfield Chemistry, Apr. 3-5, 2017, 25 pages.

Selvin et al., "Principles and biophysical applications of lanthanide-based probes," Annual Review of Biophysics and Biomolecular Structure, Jun. 2002, 31:275-302, 28 pages.

Sepulveda et al., "Oil-Based Foam and Proper Underbalanced-Drilling Practices Improve Drilling Efficiency in a Deep Gulf Coast Well," SPE 115536, Society of Petroleum Engineers (SPE), presented at the 2008 SPE Annual Technical Conference and Exhibition in Denver, Colorado, Sep. 21-24, 2008, 8 pages.

(56) References Cited

OTHER PUBLICATIONS

Serra, "No Pressure Transient Analysis Methods for Naturally Fractured Reservoirs," (includes associated papers 12940 and 13014), Journal of Petroleum Technology, Dec. 1983, 35:12, Society of Petroleum Engineers, 18 pages.

Serres-Piole et al., "Water tracers in oilfield applications: Guidelines," Elsevier Ltd., Journal of Science and Engineering, Nov. 2012, 98-99:22-39, 18 pages.

Shahid et al., "Natural-fracture reactivation in shale gas reservoir and resulting microseismicity," SPE 178437, Journal of Canadian Petroleum Technology, Nov. 2015, 54:06, 10 pages.

Shin et al., "Development and Testing of Microcompression for Post Irradiation Characterization of ODS Steels," Journal of Nuclear Materials, 2014, 444:43-48, 6 pages.

Shook et al., "Determining Reservoir Properties and Flood Performance from Tracer Test Analysis," SPE 124614, Society of Petroleum Engineers (SPE), presented at SPE Annual Technical Conference and Exhibition, Oct. 4-7, 2009, 19 pages.

Shukla et al., "Nanoindentation Studies on Shales," ARMA 13-578, American Rock Mechanics Association (ARMA), presented at the 47th US Rock Mechanics/Geomechanics Symposium, Jun. 23-26, 2013, 10 pages.

Sierra et al., "Woodford Shale Mechanical Properties and the Impacts of Lithofacies," ARMA 10-461, American Rock Mechanics Association (ARMA), presented at the 44th US Rock Mechanics Symposium and 5th US-Canada Rock Mechanics Symposium, Jun. 27-30, 2010, 10 pages.

Singh et al., "Facies classification based on seismic waveform," presented at the 5th Conference & Exposition on Petroleum Geophysics, Jan. 15-17, 2004, 456-462, 7 pages.

Siskin et al., "Reactivity of organic compounds in hot water: geochemical and technological implications," Science, Oct. 11, 1991, 254, 8 pages.

Slatt et al., "Merging Sequence Stratigraphy and Geomechanics for Unconventional Gas Shales," The Leading Edge, Special Section: Shales, Mar. 2011, 8 pages.

Slatt et al., "Outcrop/Behind Outcrop (Quarry), Multiscale Characterization of the Woodford Gas Shale," in Breyer, Shale Reservoirs—Giant Resources for the 21st Century: AAPG Memoir, 2011, 97:1-21, 22 pages.

Sone et al., "Mechanical Properties of Shale-Gas Reservoir Rocks—Part 2: Ductile Creep, Brittle Strength, and Their Relation to the Elastic Modulus," Geophysics, Sep.-Oct. 2013, 78:5 (D393-D402), 10 pages.

Sone et al., "Mechanical Properties of Shale-Gas Reservoir Rocks—Part 1: Static and Dynamic Elastic Properties and Anisotropy," Geophysics, Sep.-Oct. 2013, 78:5 (D381-D392), 13 pages.

Song et al., "SERS-Encoded Nanogapped Plasmonic Nanoparticles: Growth of Metallic Nanoshell by Templating Redox-Active Polymer Brushes," Journal of the American Chemical Society (JACS), Apr. 28, 2014, 136: 6838-6841, 4 pages.

Soni, "LPG-Based Fracturing: An Alternative Fracturing Technique in Shale Reservoirs," IADC/SPE-170542-MS, Society of Petroleum Engineers (SPE), IADC/SPE Asia Pacific Drilling Technology Conference, Aug. 25-27, 2014, 7 pages.

Stiles et al., "Surface-enhanced Raman Spectroscopty," Annual Review of Analytical Chemistry, Mar. 18, 2008, 1:601-26, 29 pages.

Tabatabaei et al., "Well performance diagnosis with temperature profile measurements," SPE 147448, Society of Petroleum Engineers (SPE), in SPE Annual Technical Conference and Exhibition, Oc. 30-Nov. 2, 2011, published Jan. 2011, 16 pages.

Tian et al., "Off-Resonant Gold Superstructures as Ultrabright Minimally Invasive Surface-Enhanced Raman Scattering (SERS) Probes," American Chemical Society (ACS), Chemistry of Materials (CM), Jul. 2015, 27: 5678-5684, 7 pages.

Ulboldi et al., "Rock strength measurement on cuttings as input data for optimizing drill bit selection," SPE 56441, Society of Petroleum Engineers (SPE), presented at the 1999 SPE Annual Technical Conference and Exhibition, Oct. 3-6, 1999, 9 pages.

Uleberg and Kleppe, "Dual Porosity, Dual Permeability Formulation for Fractured Reservoir Simulation," TPG4150, Reservoir Recovery Techniques, Combined Gas/Water Injection Subprogram, 1996, 12 pages.

Ulm et al., "Material Invariant Poromechanics Properties of Shales," 2005, 8 pages.

Ulm et al., "The Nanogranular Nature of Shale," Acta Geotechnica, Springer, Jun. 15, 2006, 1:2, 12 pages.

Vanlandingham, "Review of Instrumented Indentation," Journal of Research of the National Institute of Standards and Technology, Jul.-Aug. 2003, 108:4 (249-265), 17 pages.

Vernik et al., "Ultrasonic Velocity and Anisotropy of Hydrocarbon Source Rocks," Geophysics, May 1992, 57:5 (727-735), 9 pages.

Walters et al., "Kinetic rheology of hydraulic fracturing fluids," SPE 71660, Society of Petroleum Engineers (SPE), SPE Annual Technical Conference and Exhibition, Sep. 30-Oct. 3, 2001, 12 pages.

Wang et al, "A Feasibility Analysis on Shale Gas Exploitation with Supercritical Carbon Dioxide," Energy Sources, Part A: Recovery, Utilization, and Environmental Effects 2012, 34:15 (1426-1435), 11 pages.

Wang et al. "Iron Sulfide Scale Dissolvers: How Effective Are They?" SPE 168063, Society of Petroleum Engineers (SPE), presented at the SPE Saudi Arabia Section Annual Technical Symposium and Exhibition, May 19-22, 2013, 22 pages.

Wang et al., "A Numerical Study of Factors Affecting the Characterization of Nanoindentation on Silicon," Materials Science and Engineering: A, Feb. 25, 2007, 447:1 (244-253), 10 pages.

Wang et al., "Iron Sulfide Scale Dissolvers: How Effective Are They?" SPE-168063-MS, Society of Petroleum Engineers (SPE), presented at the SPE Saudi Arabia section Annual Technical Symposium and Exhibition, May 19-22, 2013, 22 pages.

Wang et al., "The Flattened Brazilian Disc Specimen Used for Testing Elastic Modulus, Tensile Strength and Fracture Toughness of Brittle Rocks: Analytical and Numerical Results," International Journal of Rock Mechanics and Mining Sciences, 2004, 41:2 (245-253), 9 pages.

Warpinski, "Understanding Hydraulic Fracture Growth, Effectiveness, and Safety Through Microseismic Monitoring," Chapter 6, in Effective and Sustainable Hydraulic Fracturing, Intech, May 17, 2013, 14 pages.

Warren and Root, "The Behavior of Naturally Fractured Reservoirs," SPE 426, Society of Petroleum Engineers (SPE), SPE Journal, Sep. 1963, 3:3 (245-255), 11 pages.

Wegst et al., "Bioinspired Structural Materials," Nature Materials, Jan. 2015, 14, 14 pages.

Wenk et al., "Preferred Orientation and Elastic Anisotropy of Illite-Rich Shale," Geophysics, Mar.-Apr. 2007, 72:2 (E69-E75), 7 pages.

Wessels et al., "Identifying fault activation during hydraulic stimulation in the Barnett shale: source mechanisms, b values, and energy release analyses of microseismicity," presented at the SEG San Antonio 2011 Annual Meeting, Sep. 18-23, 2011, 5 pages.

Wilson and Aifantis, "On the Theory of Consolidation with Double Porosity," International Journal of Engineering Science, 1982, 20:9 (1009-1035), 27 pages.

Wilson et al., "Fracture Testing of Bulk Silicon Microcantilever Beams Subjected to a Side Load," Journal of Microelectromechanical Systems, Sep. 1996, 5:3, 9 pages.

Wu et al., "A reusable biosensor chip for SERS-fluorescence dual mode immunoassay," Proc. SPIE 9543:954317-1, Third International Symposium on Laser Interaction with Matter, LIMIS 2014, May 4, 2015, 6 pages.

Wu et al., "A SERS-Assisted 3D Barcode Chip for High-Throughput Biosensing," Nano Micro Small Journal, Jun. 11, 2015, 11:23 (2798-2806), 9 pages.

Wu et al., "Extraction of kerogen from oil shale with supercritical carbon dioxide: Molecular dynamics simulations," the Journal of Supercritical Fluids, 107: 499-506, Jan. 2016, 8 pages.

Wurster et al., "Characterization of the fracture toughness of microsized tungsten single crystal notched specimens," Philosophical Magazine, May 2012, 92:14 (1803-1825), 23 pages.

(56) References Cited

OTHER PUBLICATIONS

Wurzenberger et al., "Nitrogen-Rich Copper(II) Bromate Complexes: an Exotic Class of Primary Explosives," Journal of Inorganic Chemistiy, 2018, 57: 7940-7949, 10 pages.

Xu et al., "Anisotropic elasticity of jarosite: A high-P synchrotron XRD study," American Mineralogist, 2010, 95:1 (19-23), 5 pages.

Xu et al., "Measurement of two-photon excitation cross sections of molecular fluorophores with data from 690 to 1050 nm," Journal of the Optical Society of America B, Mar. 1996, 13:3, 11 pages.

Yang et al., "Nanoscale geochemical and geomechanical characterization of organic matter in shale," Nature Communications, Dec. 19, 2017, 8:2179, 9 pages.

Yoldas, "Alumina gels that form porous transparent Al2O2," Journal of Materials Science, 1975, 10: 1856-1860, 5 pages.

Zamberi et al., "Improved Reservoir Surveillance Through Injected Tracers In A Saudi Arabian Field: Case Study," SPE 166005, Society of Petroleum Engineers (SPE), presented at SPE Reservoir Characterization and Simulation Conference and Exhibition, Sep. 16-18, 2013, 15 pages.

Zemel, "Chapter 3: Interwell Water Tracers," Tracers in the Oil Field, 43:1, Elsevier Science, Jan. 13, 1995, 47 pages.

Zeszotarski et al., "Imaging and Mechanical Property Measurements of Kerogen via Nanoindentation," Geochimica et Cosmochimica Acta, Oct. 15, 2004, 68:20 (4113-4119), 7 pages.

Zhou et al., "Upconversion luminescent materials: advances and applications," American Chemical Society (ACS), Chemical Reviews, Jan. 14, 2015, 115: 395-465, 71 pages.

Zielinski et al, "A Small-Angle Neutron Scattering Study of Water in Carbon Dioxide Microemulsions," Langmuir 1997, 13:15 (3934-3937), 4 pages.

Zimmerman and Bodvarsson, "Hydraulic Conductivity of Rock Fractures," transport in Porous Media, Jan. 1996, 23: 1-30, 31 pages.

PCT International Search Report and Written Opinion in International Appln. No. PCT/US2021/031729, dated Aug. 17, 2021, 13 pages.

\* cited by examiner

CERAMIC-COATED PROPPANT

TECHNICAL FIELD

This disclosure relates to proppant for hydraulic fracturing.

BACKGROUND

Hydraulic fracturing employs fluid and material to generate fractures in a geological formation to stimulate production from oil and gas wells. Hydraulic fracturing is a well-stimulation technique in which rock is fractured by a pressurized liquid. The process can involve the high-pressure injection of fracturing fluid into a wellbore to generate cracks in the deep-rock formations through which natural gas, petroleum, and brine will flow more freely. The fracturing typically generates paths that increase the rate at which production fluids can be produced from the reservoir formations. Hydraulic fracturing may increase the flow of oil or natural gas from a well. The amount of increased production may be related to the amount of fracturing. Proppants may be employed to maintain the fractures open as pressure depletes in the well during hydrocarbon production.

Hydraulic fracturing may allow for the recovery of oil and natural gas from formations that geologists once believed were impossible to produce, such as certain shale formations. Hydraulic fracturing may be employed in formation rocks such as sandstone, shale, and some coal beds to increase crude oil or gas flow to a well from petroleum-bearing rock formations. A beneficial application may be horizontal wellbores or deviated wellbores in geological formations having hydrocarbons such as natural gas and crude oil. Proppant is typically utilized resist formation closure stresses to keep fractures open.

SUMMARY

An aspect relates to a method of forming a ceramic-coated proppant. The method includes receiving a proppant and coating the proppant with ceramic to give a ceramic coating on the proppant. The ceramic coating includes a ceramic matrix composite (CMC).

Another aspect is a method of forming ceramic-coated proppant including forming ceramic coating on particles. The particles are core proppant of the ceramic-coated proppant. The ceramic coating includes a CMC.

Yet another aspect is a method of hydraulic fracturing, including injecting a fracturing fluid through a wellbore into a geological formation. The fracturing fluid includes a ceramic-coated proppant that is a core proppant coated with a ceramic coating having a CMC. The method includes hydraulically fracturing the geological formation with the fracture fluid (thereby generating fractures in the geological formation) and positioning the ceramic-coated proppant in the fractures.

Yet another aspect is a method of forming a ceramic-coated proppant. The method includes receiving a proppant and coating the proppant with ceramic to give a ceramic coating on the proppant. The action of coating the proppant with ceramic includes coating the proppant with ground ceramic comprising calcined clay, uncalcined clay, bauxite, silica, geopolymer, or alumina, or any combinations thereof.

Yet another aspect is a method of forming a ceramic-coated proppant. The method includes receiving a proppant (e.g., sand) that is not ceramic, and coating the proppant with ceramic to give a ceramic coating on the proppant.

Yet another aspect is method of hydraulic fracturing, including injecting a fracturing fluid through a wellbore into a geological formation. The fracturing fluid includes a ceramic-coated proppant that is a core proppant coated with a ceramic coating, wherein the core proppant does not include ceramic. The method includes hydraulically fracturing the geological formation with the fracture fluid to generate fractures in the geological formation, and conveying the ceramic-coated proppant via the fracturing fluid into the fractures.

The details of one or more implementations are set forth in the accompanying drawings and the description below. Other features and advantages will be apparent from the description and drawings, and from the claims.

BRIEF DESCRIPTION OF DRAWINGS

Like reference numbers in figures indicate like elements.

DETAILED DESCRIPTION

Figure 1:
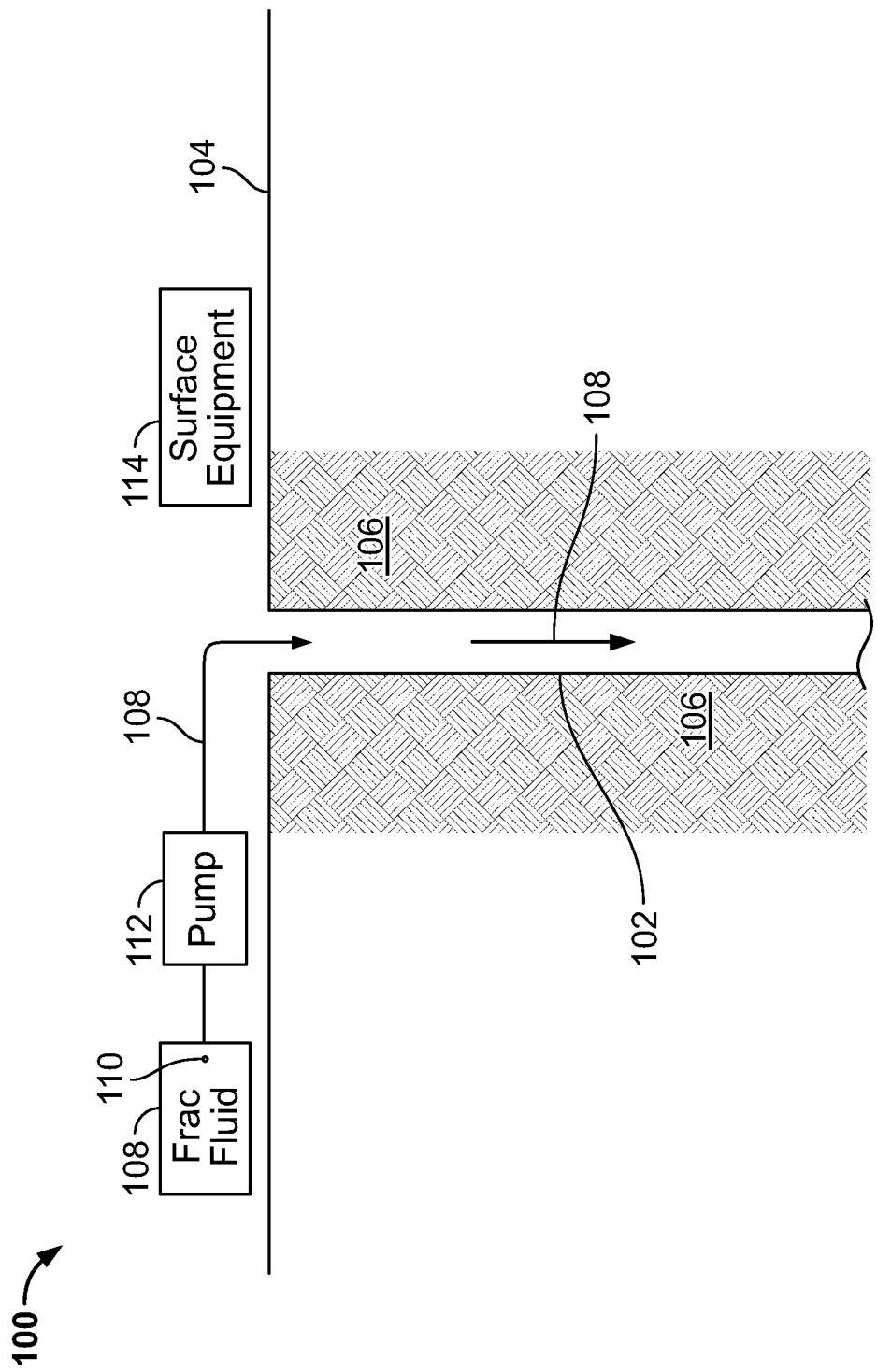
FIG. 1 is a diagram of a well site having a hydraulic fracturing system.

Some aspects of the present disclosure are directed to ceramic-coated proppant, methods of forming the ceramic-coated proppant, and methods of hydraulic fracturing with the ceramic-coated proppant. The ceramic-coated proppant may be ceramic-coated sand. Embodiments coat particles, such as sand particles, with ceramic and sinter the ceramic coating to strengthen the underlying particle as a proppant. Examples of the ceramic include bauxite, kaolin, and alumina. In certain embodiments, ceramic fibers may be incorporated into the ceramic coating to give ceramic matrix composite (CMC) coating that increases the crack resistance or fracture toughness of the ceramic-coated proppant. In general, a ceramic material is an inorganic non-metallic material and may include, for example, crystalline oxide, alumina, nitride, or carbide material. Some elements, such as carbon or silicon, may be considered ceramics.

The particles (underlying core particles) coated with the ceramic may be proppant and may be inorganic or organic. The inorganic particles include, for example, sand, ceramic, or metal. The organic particles include, for example, walnut hull, thermoplastic resin, polymer derived resin (PDR), or thermoset resin (for instance, epoxy or phenolic). The underlying particles coated with the ceramic may also be categorized as ceramic particles or non-ceramic particles. The non-ceramic particles include organic particles. The non-ceramic particles include inorganic particles (for example, sand or metal) other than ceramic.

Embodiments may coat various types of proppant (whether organic or inorganic) with ceramic coating. Ceramic proppants can be coated with ceramic coating to improve the performance and properties of the already existing ceramic proppants. For instance, a ceramic proppant may have inadequate strength or inadequate chemical resistance to corrosion. The ceramic coatings of the present techniques may increase strength and chemical resistance of the underlying ceramic proppant. In some cases, a plastic proppant is coated with ceramic to give proppant of adequate strength with reduced density. Inorganic proppant, such as sand, alumina-based proppant, silicate-based proppant, or metal-oxide proppant may be coated with ceramic. Organic proppant, such as walnut hull or thermoset resin, may be coated with ceramic.

Ceramic proppant and sand are used in hydraulic fracturing to maintain the fractures open for enhancing the flow of hydrocarbon production. The success of the stimulation may partially depend on the strength of the proppant to withstand formation closure stresses. Crushing of proppant under formation closure stresses generates fines which can migrate and plug the pores throat of the proppant pack. The plugging of the pores throat may reduce conductivity of the proppant pack and fractures, which can reduce flow of produced hydrocarbon.

An increase in strength of proppant may be advantageous for several reasons. Proppant with increased strength can typically better hold the fracture open and maintain the conductivity of the fracture for hydrocarbon to flow. Stronger proppant is more resistant to crushing and associated fines generation that plug the pores of the proppant pack. Stronger proppant can prolong the conductivity and permeability of the proppant pack as compared to weaker proppant. Embodiments may extend use of sand (for example, Saudi sand or brown sand) to formations having greater closure-stresses. Saudi sand and brown sand may be less quality and less expensive than typical sand. Increasing strength of sand (via ceramic coating of the sand) may be a less expensive option than using intermediate-strength proppant, such as ceramic proppant.

Sand and ceramic proppant may be coated with resins. Examples of resins include furan resin, epoxy resin, polyurethane resin, phenolic resin, polyester resin, polyurea resin, and polyimide resin. The proppant is coated with resin to enhance strength, chemical resistance, and proppant flowback control, and to prevent or reduce crushed generated fines from migrating. However, resin coating may suffer drawbacks. While resin coating may increase the crush strength of the proppant by distributing the stress over a larger area, the core-material crush strength may remain unchanged. Further, resin coating generally degrades over time in wellbore conditions. Also, resin may become plasticized when the resin absorbs water or oil in typical wellbore conditions. Wellbore temperature can further contribute to the proppant becoming plasticized. The plasticized resin coating can creep into the pore space of proppant pack and thereby reduce conductivity. Such creep can be accelerated in presence of formation temperatures greater than typical. Furthermore, cross-linked resin coatings can become brittle under heat and disintegrate, which can generate plastic fines that plug the proppant pack. Lastly, some resin systems are affected by corrosive chemicals, such as acid or base. For example, phenolic resins may be degraded by fluids having a pH greater than 9 or 10.

Sand and ceramic proppant can be coated with preceramic polymers or polymer-derived-ceramics (PDCs) resin. Polymer-derived-ceramics (PDCs) define a class of ceramic materials that are synthesized by thermal treatment (usually pyrolysis) of ceramic precursors (so-called preceramic polymers) under an inert or reacting atmosphere. By utilizing preceramic polymers, ceramic compositions such as amorphous silicon carbide (SiC), silicon oxycarbide (SiOC), and silicon carbonitride (SiCN), can be obtained after heat treatment, for example, at 1000-1100° C. in an inert atmosphere (argon or nitrogen). As there is generally no sintering step, PDC parts can be formed in some implementations without pressure at lower temperatures relative to traditional ceramic powder shaping technologies. Preceramic polymers can be processed utilizing existing technologies suitable for polymers in general. Due to the PDC distinctive nanostructure of carbon-rich and free carbon domains, PDCs may show exceptional stability against oxidation, crystallization, phase separation, and creep even up to 1500° C. PDCs have been successfully employed for the fabrication of ceramic fibers, ceramic matrix composites (CMCs), and microstructures that may be part of the proppant coating.

In contrast, present embodiments provide an alternative to resin coating of proppant. Implementations increase the crush strength of the proppant material and may avoid shortcomings of resin-coated proppant. Embodiments provide methods and compositions to strengthen proppant, such as sand. Inorganic proppant or particles and organic proppant or particles may be coated with ceramic compositions to give ceramic-coated proppant. The inorganic proppant that receives the ceramic coating may be ceramic or instead may be proppant or particles that are non-ceramic (for example, sand or metal). The organic proppant that receives the ceramic coating may be, for example, walnut hulls or resin proppant. In the case of sand, the present coating of sand may increase the crush strength of the proppant sand, thereby extending applications in hydraulic fracturing of proppant sand as compared to usage of the base proppant sand without coating. Described later are multiple techniques to coat proppant particles with ceramic-based coating to increase proppant strength. The proppant receiving the ceramic coating may be considered the core proppant (or core particles) and be inorganic particles (for example, sand particles, ceramic particles, or metal particles), organic particles, or non-ceramic particles (for example, sand or metal particles), as discussed. The techniques may prepare strengthened proppant by coating the core proppant particles.

A first embodiment (coating particles with ground ceramic) coats the particles with a mixture having a ground ceramic. The ground ceramic may be a finely ground ceramic having a mean particle size, for example, in a range from 1 micron to 12 microns. The ground ceramic may include calcined clay, uncalcined clay, bauxite, silica, alumina, geopolymer, or mixtures thereof. In certain implementations, the ground ceramic has total alumina content greater than 40 weight percent (wt %). As for the ground ceramic mixture, the ground ceramic material may be mixed with a binder such as a poly(2-ethyl-2-oxazoline) solution, polyvinyl alcohol solution, waxes, or starch. The ground ceramic mixture may include the binder, for example at 0.1 wt % to 1.5 wt % of the amount of ceramic in the mixture. The ground ceramic may include reinforcing particles or fibers. The ground ceramic may include a reinforcing agent (for example, reinforcing particles or fibers) to give the ceramic coating having or as a CMC, as discussed later.

The ground ceramic mixture (coating composition) may be added to the sand or other proppant particles to be strengthened in a high-intensity mixer or drum coater. The amount of ceramic coating material may 1% to 20% by weight of the coated particles (ceramic-coated proppant). Water may be added to the mixture in the high-intensity mixer or drum coater to make any dusty powder of the composition stick on the particles and form a layer. Some implementations of mixers that may be employed in the process of coating of the present implementations are described in U.S. Pat. No. 3,690,622, which is incorporated by reference in its entirety. High-intensity mixing can refer to mixers having typical tip speed of the mixing tool greater than 25 meters per second. The aforementioned binder may be added to initial ground-ceramic mixture to increase the green strength of the coating. The green strength of the coating may be the strength of the coating prior to drying, sintering, or densifying of the coating.

The binder as poly(2-ethyl-2-oxazoline) or similar compound may be preferred and specified over polyvinyl alcohol (PVA) and other polymeric binders to increase strength and density of the green ceramic coating. The poly(2-ethyl-2-oxazoline) or similar compound may exhibit greater temperature stability and shear stability than other polymeric binders and, therefore, may be beneficial for coating applications. Unlike PVA, which off-gasses at 190° C., poly(2-ethyl-2-oxazoline) binder begins to degrade at 380° C. with little or no "unzipping" mechanism, thereby reducing the risk of cracks in finished coating in the sintering process. The green ceramic coating having binder may also beneficially provide for the ceramic-coated proppant to be more round or spherical than the underlying angular particles of sand or other core proppant. The increased sphericity generally gives better mechanical and compressive strength than angular or irregular particles.

The resulting (green) ceramic-coated particles may be dried and screened to sintering size, and fired at sintering temperature of in a range of 600° C. to 1600° C., or below 1200° C. To prevent or reduce delamination and cracking of the ceramic coating due to uneven expansion, a bonding additive may be incorporated in the ceramic coating prior to the screening and sintering.

Bonding additives may be a low melting-point binder (for example melting point less than 400° C., less than 500° C., or less than 600° C.), photo-curable binder, or inorganic binder. The bonding additive may be an inorganic binder powder that may include a metal, an intermetallic compound, or a ceramic, or mixtures thereof. Other binders can include heavy fuel oil, boron nitride, oxynitride glass, aluminum carbide (Al2C3), silicon carbide (SiC2) aluminum nitride (AlN), bismuth tertroxide (Bi2O3), boron oxide (B2O3), zirconia (ZrO2), silica (SiO2), or rare earth oxides.

A second embodiment (coating particles with slurry) coats the particles with a slurry, such as a slurry having the ground ceramic mixture of the first embodiment. The slurry may be a ground ceramic slurry. The ground-ceramic solid mixture combined with a liquid (for example, water) to form the slurry may have particle sizes in the range of 1 micron to 12 microns. The ground ceramic mixture may be mixed with water (for example, deionized water) to give the slurry, for instance, with 10% to 50% by weight of solids content. As mentioned, the ground ceramic may include reinforcing particles or fibers. The ground ceramic of the slurry may include a reinforcing agent (for example, reinforcing particles or fibers) to give the ceramic coating having or as a CMC, as discussed later.

In certain implementations, the ground ceramic (or ground ceramic mixture) is fed to a vessel for mixing with water. In some implementations, the vessel is a vat, tank, or container of a blunger. The blunger vessel has a mixer, stirrer, rotating blade, or rotating arms for mixing. The water may be added to the vessel (for example, blunger vessel) to be mixed with the ground ceramic to form the slurry. Vessels and systems other than a blunger may mix the water and ground ceramic to form the slurry. In one implementation, the ground ceramic is mixed with water flowing through a conduit to form the slurry. The conduit may have a mixer such as static mixers.

In implementations, pH adjusting agents and dispersant may be added to the slurry to achieve targeted viscosity for ease of coating the particles. The target viscosity for the slurry coating may be less than 100 centipoise (cP) at 35° C. The pH adjusting agent may added to adjust pH of slurry to the range of 8 to 11. The pH adjusting agent may include ammonia, sodium carbonate, or sodium hydroxide. Examples of dispersants include sodium polyacrylate, ammonium polyacrylate, tetrasodium pyrophosphate, polymethacrylate, ammonium polymethacrylate, ammonium citrate, polyacrylamides, polyvinylpyrallidone, and starch. Dispersant may be added to slurry before a sintering aid is added so to promote dispersion of the sintering aid when added. The dispersant added may give dispersant in the range of 0.15% to 0.50% by weight of the coating slurry composition. This weight-percent range is based on the slurry and not on the dry weight.

After formation of slurry, the slurry may be fed to vessel where the slurry is stirred and the aforementioned binder added to increase green strength of the coating. The binder may added, for example, in the amount 0.2% to 5.0% based on dry weight of all the components in the slurry coating ceramic material. As discussed, the binder may include PVA, starch, methylcellulose, waxes or poly(2-ethyl-2-oxazoline). The poly(2-ethyl-2-oxazoline binder may provide benefits discussed earlier with respect to the first embodiment. The slurry may be mixed to dissolve the binder uniformly. A bonding additive may be added to the slurry to prevent or restrict delamination and cracking of the ceramic coating due to uneven expansion during or after sintering The slurry formed may be coated onto the sand or other core-proppant particles to be strengthened via a high-intensity mixer (for example, Eirich granulator), drum coater, spray coating, fluidized bed coating, or wet dip coating. The amount of ceramic coating material coating the particles may range from 1% to 20% by weight of the core particles or of the ceramic-coated proppant. In implementations, the resulting ceramic-coated particles are then dried in air to form green coated particles. The green coated particles may be screened to sintering size and fired at sintering temperature of 600-1600° C., or at less than 1200° C. The sintering can be done in rotary kiln or in a microwave apparatus.

A third embodiment (coating particles by solution-gelation) prepares strengthened proppant by coating particles via a solution-gelation technique(s) which may include forming a liquid dispersion or sol of colloidal ceramic precursor in a solvent with additives. The ceramic precursors can be alumina-based, silicone-based, zirconia-based, or magnesium-based, or mixtures thereof. In one implementation, an alumoxane sol-gel is formed by alumina containing mineral dispersed or solubilized in mineral acid or organic acid. By changing component concentrations or pH of the dispersion, the dispersion may be polymerized to form flowable dispersion or gel. Incorporation of ceramic powder in the sol-gel may facilitate coating to be formed on the sand particles or other non-ceramic particles. The coating may be a crack-free coating after sintering of the coated particles.

The sol-gel coating process may have at least five stages: dispersion, gelation, coating, drying, and lastly firing to make the ceramic-coated proppant. A stable liquid dispersion or sol of colloidal ceramics precursors is initially formed in a solvent with additives. By changing the pH and adjusting component concentrations, the dispersion is polymerized to form a solid dispersion or gel. The gel can be coated on ceramic particles or sand particles (or other non-ceramic particles). Excess liquid may be removed from the coated gel by drying, and the final ceramic on the particle is formed by firing the coated gel at high temperature. The dispersion or suspension may include additives such as binder material, film stabilizing agent, and dispersion agent. The particles may be coated with the dispersion or suspension having the additive by coating techniques such as by fluidized bed or drum coater. The coated green particles can be sintered in a rotary kiln, fluidized-bed furnace, or gravity-fed furnace.

One implementation of sol gel is the formation of alumina sol gel, and which may utilize alumina hydroxide or hydroxide-based material as the solid colloidal in water or an organic solvent. The alumina gels can also be prepared from hydrolysis of aluminum alkoxides. The typical composition of this gel includes an alumina compound, mineral acid, and complexing agents to inhibit premature precipitation of the gel. The alumina compound may be pseudoboehmite. Pseudoboehmite is an aluminium compound with the chemical composition AlO(OH) and having finely crystalline boehmite with a water content typically greater than the boehmite.

Reinforcing additives (agents) such as fibers and particles can be added before application of the coating to the particle to strengthen the coating and prevent cracking of coating. The fibers and particles can include silicon oxide, zirconia oxide, or magnesium oxide, or any combinations thereof. The reinforcing materials can include carbon black, fiberglass, carbon fibers, ceramic whiskers, ceramic particles, or metallic particles, or any combinations thereof. The ground ceramic may include the reinforcing particles or fibers to give the ceramic coating having or as a CMC, as discussed in additional detail later.

The ceramic coating can be hardened by converting or forming a carbide or a nitride, or both, on the ceramic coating. Examples of the carbide or nitride formed include silicone carbide, silicone nitride, zirconium carbide, zirconium nitride, metal nitride, or metal carbide, or any combinations thereof.

The first-embodiment ground mixture, the second-embodiment slurry of ground mixture, and the third-embodiment flowable gel may be coated onto the core particles by typical coating techniques and equipment such as a drum coater, Eirich-mixing granulator, and spray coating. The slurry and flowable gel may also be coated onto the particles by fluidized bed coating or wet dip coating. The ceramic coating may be 20 percent to 90 percent by weight of the ceramic-coated proppant. The ceramic coating may include reinforcing particles or fibers having a particle size in a range from 1 micron to 50 microns. The ceramic coating may include reinforcing particles or fibers at about 10 percent to 75 percent by weight of the ceramic-coating composition. The reinforcing particles or fibers may be particles or fibers of alumina, carbon, silicon carbide, alumina, or mullite, or mixtures thereof. The fibers of these materials may have an aspect ratio of greater than 1:2. The aspect ratio of a fiber is the ratio of the length of the fiber to the diameter of the fiber. The inclusion of a reinforcing agent (for example, the reinforcing particles or fibers) can give the ceramic coating having or as a CMC.

The coated particles prior to drying, sintering, or densifying of the coating may be referred to as green coated particles. In the first, second, and third embodiments, as well as in other embodiments, the green coated particles may be dried at temperatures greater than ambient and then sintered at a temperature, for example, in the range of 600° C. to 1400° C., or at less than 1200° C. The coated particles may be sintered in a rotary kiln or via microwave sintering. The ceramic coating mixture may have additives to facilitate sintering and to increase the mechanical strength of the coating. These additives may include, for example, a sintering aid, dispersants, mullite growth promoter, organic fibers, inorganic fibers, organic particles, and inorganic particles.

The sintering aid may include, for example, iron(II) oxide or ferrous oxide (FeO), iron(III) oxide (Fe2O3), iron(II, III) oxide (Fe3O4), magnesium oxide (MgO), zinc oxide (ZnO), manganese(II) oxide (MnO), and manganese(III) oxide (Mn2O3). The sintering aid may be from 0.1% to 15% by weight of the ceramic-coating composition. The sintering aid may be ground to size of 1 micron to 25 microns. Other sintering aids include bentonite clay, feldspar, talc, titanium oxide and compounds of lithium, sodium, magnesium, potassium, calcium, manganese, boron, lithium carbonate, sodium oxide, sodium carbonate, sodium silicate, magnesium oxide, magnesium carbonate, calcium oxide, calcium carbonate, manganese oxide, boric acid, boron carbide, aluminum dibromide, boron nitride, and boron phosphide.

The ceramic coating material may also contain additives to promote bonding of the coating to sand or other proppant, and to prevent or reduce delamination of coating due to uneven expansion of core and coated material during and after sintering. The properties of the final sintered composite-coating and coated proppant, such as strength, specific gravity, and acid resistance, may be controlled at least in part through variation in components and component concentrations in the initial component mixture. Implementations of the ceramic coating may have ceramic fibers or a ceramic matrix composite (CMC) coating.

A fourth embodiment coats the core particles (for example, core proppant) with silica-alumina sol-incorporated alpha-alumina powder. Examples of the formation of silica-alumina sol are given in Ceramic International 39 (2013), 6041-6050. A ceramic-sol slurry is formed. The slurry may be formed by mixing a ceramic powder with a sol. The slurry is coated on the proppant to give the ceramic-coated proppant. In implementations, alumina powder is added to the sol to form the slurry. The slurry is then applied to proppant particles. In certain implementations, a mixer (for example, auger mixer or planetary mixer) mixes the ceramic slurry with proppant (core particles) to coat the proppant (core particle) with ceramic slurry before any sintering. In some implementations, the coated particles may be dried, for example, at a temperature of at least 120° C. for at least 2 hours and then densified by thermal treatment, for instance, at a temperature in the range of 600° C. to 1400° C. to give ceramic-coated proppant.

In a particular implementation, the formation of silica/alpha-alumina coatings may be derived from alumina-silica sol-incorporated alumina powder (for example, having a median particle size d50 of at least 0.509 millimeter) utilizing Al(NO3)3.9H2O and tetraethyl orthosilicate as precursors. The incorporation of ceramic powders into sols can increase thickness of the coating as a ceramic coating. The sol-gel chemistry can provide incorporation of organic components into the inorganic structures.

In application, the Al2O3 powder is incorporated into the Al2O3-SiO2 sol to give a slurry. The Al2O3 powder may have an average particle size, for example, of approximately 0.5 mm. In other implementations, the Al2O3 powder may have particle size distribution in which a majority of the particles are in a range of 10 nm to 200 nm, 1 micrometer to 200 micrometers, or 100 micrometers to 600 micrometers. This suspension or slurry is deposited on the proppant particles. In implementations, an Al2O3-SiO2 composite sol-gel coating may be formed on proppant particles. The coating can be, for example, in a range of 0.01 wt % to 4.5 wt % of the original proppant weight. The formation of the coating may involve chemically bonding the alumina sol and silica sol. In some implementations, the coating may be deposited from a water-based composite sol, such as with a slurry mixer (for example, auger mixer or planetary mixer) and cured at temperatures of at in a range of 600° C. to 1600° C., or less than 1200° C.

The ceramic powder added to the sol may include a reinforcing agent (for example, particles or fibers). The reinforcing agent may be added to the sol separate from the ceramic powder. The reinforcing agent(s) may give the ceramic coating as a CMC.

A fifth embodiment coats the particles with a CMC coating having ceramic fibers therein. The proppant coating may have ceramic fibers embedded in a ceramic matrix to form a CMC coating in the ceramic coating of the proppant. The ceramic fibers can be included in embodiments discussed earlier. Carbon (C) fibers, silicon carbide (SiC) fibers, alumina ($Al_2O_3$) fibers, and mullite ($Al_2O_3$-$SiO_2$) fibers may be employed with ceramic powder to coat the particles by techniques mentioned earlier such as a drum coater, Eirich-mixing granulator, and spray coating. The coated proppant may be dried and sintered at a temperature, for example, in the range from 600° C. to 1600° C., or less than 1200° C.

These CMC coatings may overcome issues associated with conventional ceramics such as alumina, silicon carbide, aluminum nitride, silicon nitride, and zirconia. Those conventional ceramics may fracture under mechanical or thermo-mechanical loads because of cracks initiated by small defects or scratches in the ceramic coating. To increase the crack resistance or fracture toughness, particles or whiskers may be embedded into the matrix. The integration of multi-strand fibers can increase the crack resistance, as well as increase the elongation and thermal shock resistance. The reinforcements utilized in ceramic matrix composites (CMC) may serve to enhance the fracture toughness of the combined material system while taking advantage of the inherent high strength and Young's modulus of the ceramic matrix.

The fifth embodiment has a reinforcement implementation that incorporates a continuous-length ceramic fiber having an elastic modulus typically greater than the matrix. Continuous length ceramic fibers can be woven into filament. In contrast, other fibers may have some aspect ratio and may not be able to be woven into filaments. In the present techniques, such may be immaterial because the fibers are for reinforcement and for arresting cracks. A functional role of this fiber may be to increase the CMC stress acceptance to resist progress of micro-cracks through the matrix, thereby increasing the energy expended during crack propagation. As the through-thickness cracks begin to form across the CMC under stress (for example, proportional limit stress or PLS), the continuous-length ceramic fiber may bridge these cracks without the CMC fracturing, thereby providing the CMC with greater ultimate tensile strength (UTS). In this way, ceramic fiber reinforcements may not only increase the composite-structure initial resistance to crack propagation, but also allow the CMC to avoid abrupt brittle failure characteristic of monolithic ceramics. This behavior by the CMC may be distinct from the behavior of ceramic fibers in polymer matrix composites (PMC) and metal matrix composites (MMC), where the fibers typically fracture prior to the matrix due to greater failure strain capabilities of PMC and MMC matrices.

In summary, the fifth embodiment may include a coating of the proppant that is a CMC coating having ceramic fibers. The CMC coating(s) can be prepared from different material fibers such as carbon nanotube fibers, graphene fibers, carbon fibers, silicon carbide fibers, alumina fibers, and mullite fibers.

Geopolymer ceramic coating can be coated onto particles and cured at temperature in a range from room temperature (for example, 23° C.) to 400° C. The geopolymer ceramics can coat organic proppants particles which generally cannot be subjected to sintering temperatures. The geopolymer ceramic can coat sand and other proppant materials. The geopolymer ceramic coating may be ceramic coatings based on alumina phosphate and may include alumina-containing cements or hausmannite ore (for example, ground to an average particle size of about 5 microns). A commercially-available ground hausmannite ore is MICROMAX™ weight additive available from Halliburton Company having headquarters in Houston, Tex., USA.

FIG. 1 is a well site 100 having a wellbore 102 formed through the Earth surface 104 into a geological formation 106 in the Earth crust. The wellbore 102 can be vertical, horizontal, or deviated. The wellbore 102 can be openhole but is generally a cased wellbore. The annulus between the casing and the formation 106 may be cemented. Perforations may be formed through the casing and cement into the formation 106. The perforations may allow both for flow of fracturing fluid into the geological formation 106 and for flow of produced hydrocarbon from the geological formation 106 into the wellbore 102.

The well site 100 may have a hydraulic fracturing system including a source of fracturing fluid 108 at the Earth surface 104 near or adjacent the wellbore 102. The fracturing fluid 108 may also be labeled as frac fluid, fracing fluid, or fracking fluid. The fracturing fluid 108 source may include one or more vessels holding the fracturing fluid 108. The fracturing fluid 108 may be stored in vessels or containers on ground or on a vehicle such as a truck. The fracturing fluid 108 may be a water-based fracturing fluid. In certain implementations, the fracturing fluid 108 is slick water which may be primarily water, generally 98.5% or more by volume. The fracturing fluid 108 can be prepared from seawater. The fracturing fluid 108 can also be gel-based fluids. The fracturing fluid 108 can include polymers and surfactants. Other common additives to the fracturing fluid 108 may include hydrochloric acid, friction reducers, emulsion breakers, and emulsifiers. Fracturing fluids 108 of differing viscosity may be employed in the hydraulic fracturing.

In the illustrated embodiment, the fracturing fluid 108 includes ceramic-coated proppant 110. The ceramic-coated proppant 110 may be core proppant particles coated with a ceramic coating. The core proppant particles may be inorganic particles (for example, sand, metal, or ceramic) or organic particles.

The hydraulic fracturing system at the well site 100 may include motive devices, such as one or more pumps 112, to pump or inject the fracturing fluid 108 through the wellbore 102 into the geological formation 106. The pumps 112 may be, for example, positive displacement pumps and arranged in series or parallel. Again, the wellbore 102 may be a cemented cased wellbore and have perforations for the fracturing fluid 108 to flow into (injected into) the formation 106. In some embodiments, the speed of the pump(s) 112 may be controlled to give desired flow rate of the fracturing fluid 108. The system may include a control component to modulate or maintain the flow of fracturing fluid 108 into the wellbore 102 for the hydraulic fracturing. The control component may be, for example, a control valve(s). In some implementations, the control component may be the pump(s) 112 as a metering pump in which speed of the pump 112 is controlled to give the specified flow rate of the fracturing fluid 108. The set point of the control component may be manually set or driven by a control system.

The hydraulic fracturing system at the well site 100 may have a source of proppant, which can include railcars, hoppers, containers, or bins having the proppant. Proppant may be segregated by type or mesh size (particle size). The proppant can include sand, ceramic proppants, and the ceramic-coated proppant 110. The source of proppant may be at the Earth surface 104 near or adjacent the wellbore 102. The proppant may be added to the fracturing fluid 108, such that the fracturing fluid 108 includes proppant. In some implementations, the proppant may be added (for example, via gravity) to a conduit conveying the fracturing fluid 108, such as at a suction of a fracturing fluid pump 112. The hydraulic fracturing system may include a feeder or blender to receive proppant and discharge the proppant into a conduit conveying the fracturing fluid 108.

The fracturing fluid 108 may be a slurry that is a combination of the fracturing treating fluid and proppant 110. For instances when proppant is not added to the fracturing fluid, the fracturing fluid 108 entering the wellbore 102 for the hydraulic fracturing is therefore the fracturing fluid 108 without proppant. The pump 112 discharge flow rates (or frac rates) may include a clean rate which is a flow rate of fracturing fluid without proppant. The pump 112 discharge flow rates (frac rates) may include a slurry rate which may be a flow rate of a fracturing fluid 108 as slurry having proppant, such as the ceramic-coated proppant 110. In particular implementations, the fracturing system parameters adjusted may include at least pump(s) 112 rate and proppant 110 concentration in the fracturing fluid 108. Fracturing operations can be manual or guided with controllers.

Surface equipment 116 at a well site 100 may include equipment to drill a borehole to form the wellbore 102. The surface equipment 116 may include a mounted drilling rig which may be a machine that creates boreholes in the Earth subsurface. The term "rig" may refer to equipment employed to penetrate the Earth surface 104. To form a hole in the ground, a drill string having a drill bit may be lowered into the hole being drilled. In operation, the drill bit may rotate to break the rock formations to form the hole as a borehole or wellbore 102. In the rotation, the drill bit may interface with the ground or formation 106 to grind, cut, scrape, shear, crush, or fracture rock to drill the hole. Surface equipment 116 may include equipment for installation and cementing of casing in the wellbore, as well as for forming perforations through wellbore 102 into the geological formation 106. The surface equipment 116 may also include equipment to support the hydraulic fracturing.

Figure 1A:
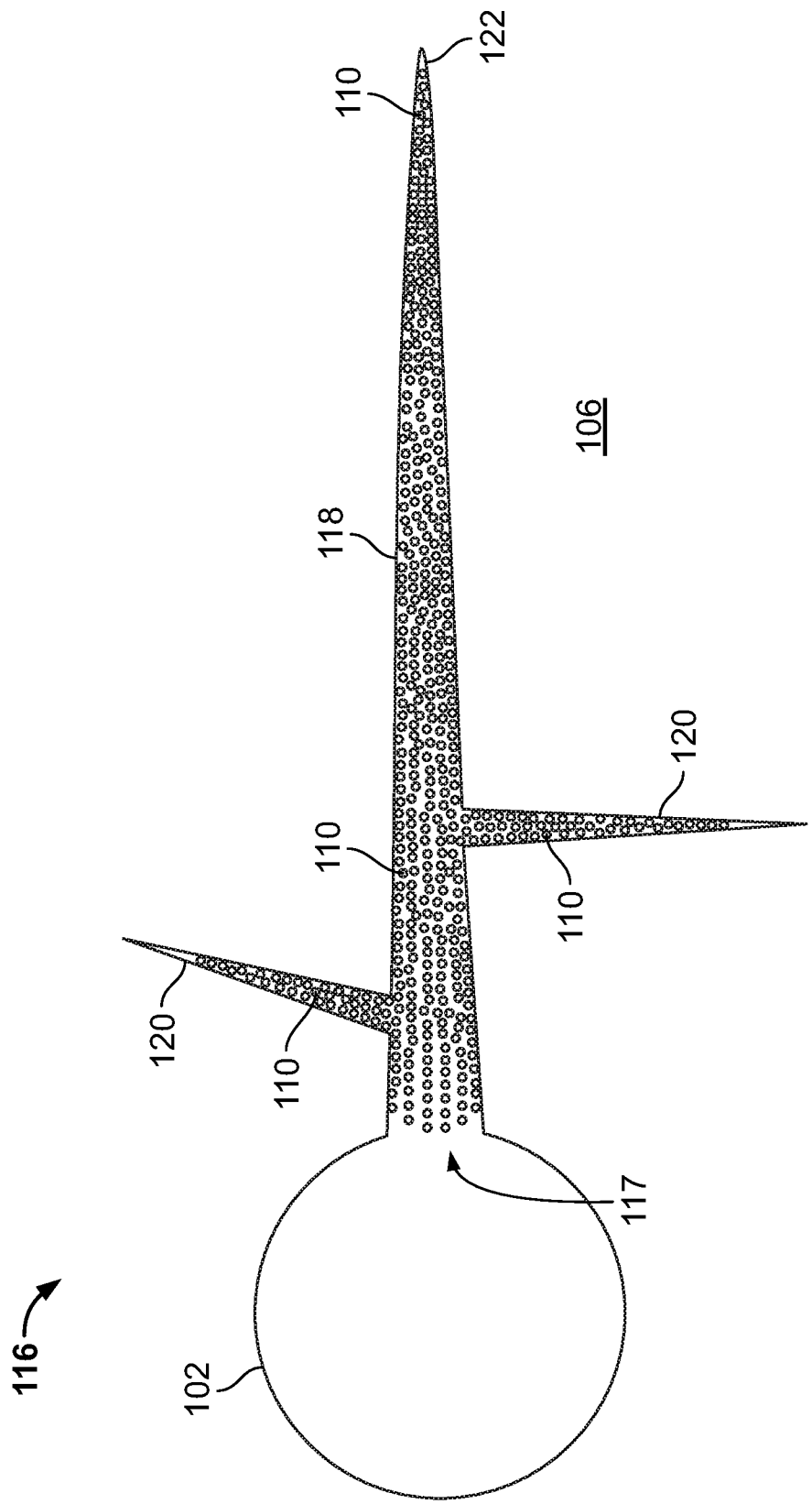
FIG. 1A is a diagram of hydraulic fractures.

FIG. 1A are hydraulic fractures 116 associated with the wellbore 102 of FIG. 1. The wellbore 102 is depicted as a circular cross-section in FIG. 1A. A perforation 117 may be formed through the wellbore 102 wall into the geological formation 106. The wellbore 102 may be a cemented cased wellbore. The perforation 117 may be formed to allow for flow of fracturing fluid 108 from the wellbore 102 into the formation 106.

In the illustrated implementation, the depicted hydraulic fractures 116 include a primary fracture 118 and secondary fractures 120. The fractures 118, 120 are hydraulically formed by injecting fracturing fluid 108 through the perforation 117 into the geological formation 106. Of course, many more secondary fractures 120 than depicted may be formed with complex fracturing via the fracturing fluid 108. The secondary fractures 120 typically have a smaller fracture width than the primary fracture.

In the illustrated embodiment, the fracturing fluid 108 conveys the ceramic-coated proppant 110 into the primary fracture 118. The proppant 110 may approach the fracture tip 122 of the primary fracture 118. The distance that the proppant 110 reaches toward the fracture tip 122 may depend on the particle size of the proppant 110. The proppant 110 may be positioned in the primary fracture 118 to maintain open the primary fracture 118. The fracturing fluid 108 may convey the ceramic-coated proppant 110 into secondary fractures 120, as depicted, depending on particle size of the proppant 110 and the fracture width of the secondary fractures 120. The proppant 110 if present in a secondary fracture 120 may maintain open the secondary fracture 120. The ceramic-coated proppant 110 may include a core proppant that is sand (or other non-ceramic particles) having a ceramic coating. The ceramic-coated proppant 110 may include a core proppant that is ceramic having a ceramic coating.

Figure 2:
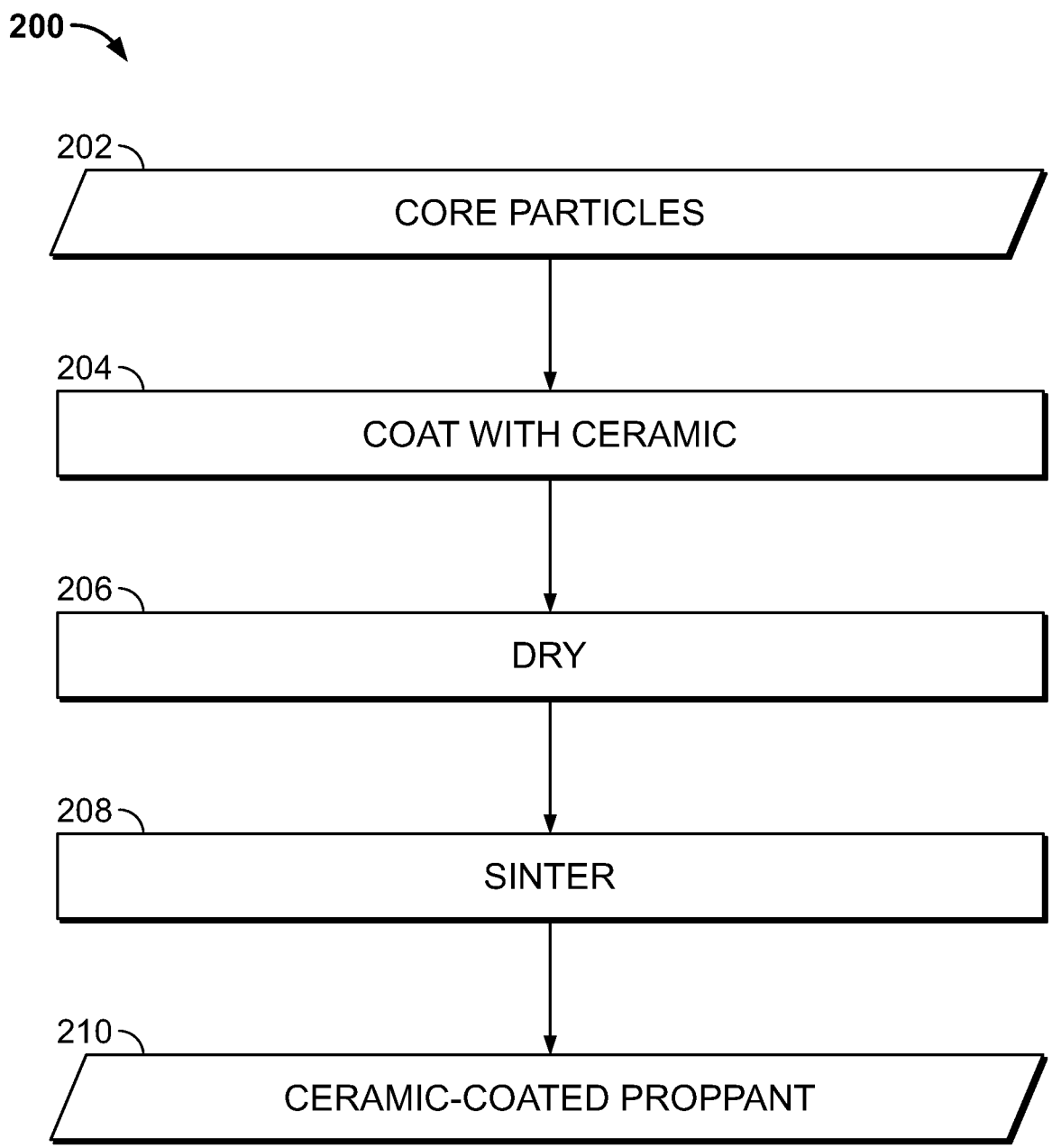
FIG. 2 is a block flow diagram of a method of forming a ceramic-coated proppant.

FIG. 2 is a method 200 of forming a ceramic-coated proppant 210 including receiving core particles 202, which may be ceramic proppant or non-ceramic proppant. The particles 202 may be may be ceramic particles. The particles 202 may be sand or other proppant or particles that are not ceramic. The particles 202 may be the core proppant of the ceramic-coated proppant 210. The method 200 may include forming a ceramic coating on sand as the particle 202 and where the sand is core proppant of the ceramic-coated proppant 210.

At block 204, the method includes coating the particles 202 with ceramic to give a ceramic coating on the particles 202. The ceramic coating may be formed on the particles 202 by applying ground ceramic to the particles 202. Coating the particles 202 with ceramic may involve coating the particles 202 with ground ceramic including calcined clay, uncalcined clay, bauxite, silica, or alumina, or any combinations thereof. The alumina content of the ground ceramic may be greater than 40 wt %. The ground ceramic may include a reinforcing agent(s) so that a CMC will form. Applying the ground ceramic may include coating the particles 202 with the ground ceramic via a drum coater, a mixing granulator, or spray coating, or any combinations thereof.

The ceramic coating may be formed on the particles 202 by applying a slurry of the aforementioned ground ceramic to the particles 202. The coating of the particles 202 with ceramic may involve coating the particles 202 with a slurry having the ground ceramic and water. In implementations, the slurry has a solids content in a range of 10 wt % to 50 wt %. The coating of the proppant via the slurry may include coating the proppant with the slurry by drum coating, spray coating, fluidized-bed coating, or wet-dip coating, or any combinations thereof.

The ceramic coating may be formed on the particles 202 by applying ceramic to the particles 202 by solution gelation. The ceramic coating may be formed on the particles 202 by applying alumina-silica sol-incorporated alpha-alumina to the particles 202. The ceramic coating may be formed on the particles 202 by applying a CMC having fibers to the particles 202. Thus, the coating of the particles 202 with ceramic may include coating the particles 202 with the ceramic by solution gelation, coating the particles 202 with alumina-silica sol-incorporated alpha-alumina powder, or coating the particles with a CMC, or any combinations thereof. The ceramic coating may include organic fibers, inorganic fibers, organic particles, or inorganic particles, or any combinations thereof.

At block 206, the method includes drying the ceramic coating on the particles 202. The particles 202 having the ceramic coating may be dried at temperatures greater than ambient. In one implementation, the coated particles are dried at a temperature of at least 120° C. for at least 2 hours. The method may include densifying the ceramic coating by thermal treatment at a temperature, for example, in a range of 600° C. to 1400° C.

At block 208, the method includes sintering the ceramic coating on the particles 202 to give the ceramic-coated proppant 210. The particles 202 as coated may be sintered in a rotary kiln or via microwave sintering, or both. The ceramic coating may have a sintering aid such as FeO, Fe2O3, Fe3O4, MgO, ZnO, MnO, or Mn2O3, or any combinations thereof. The coated particles may be sintered at a temperature, for example, in the range of 600° C. to 1400° C., or at a temperature less than 1200° C.

Figure 3:
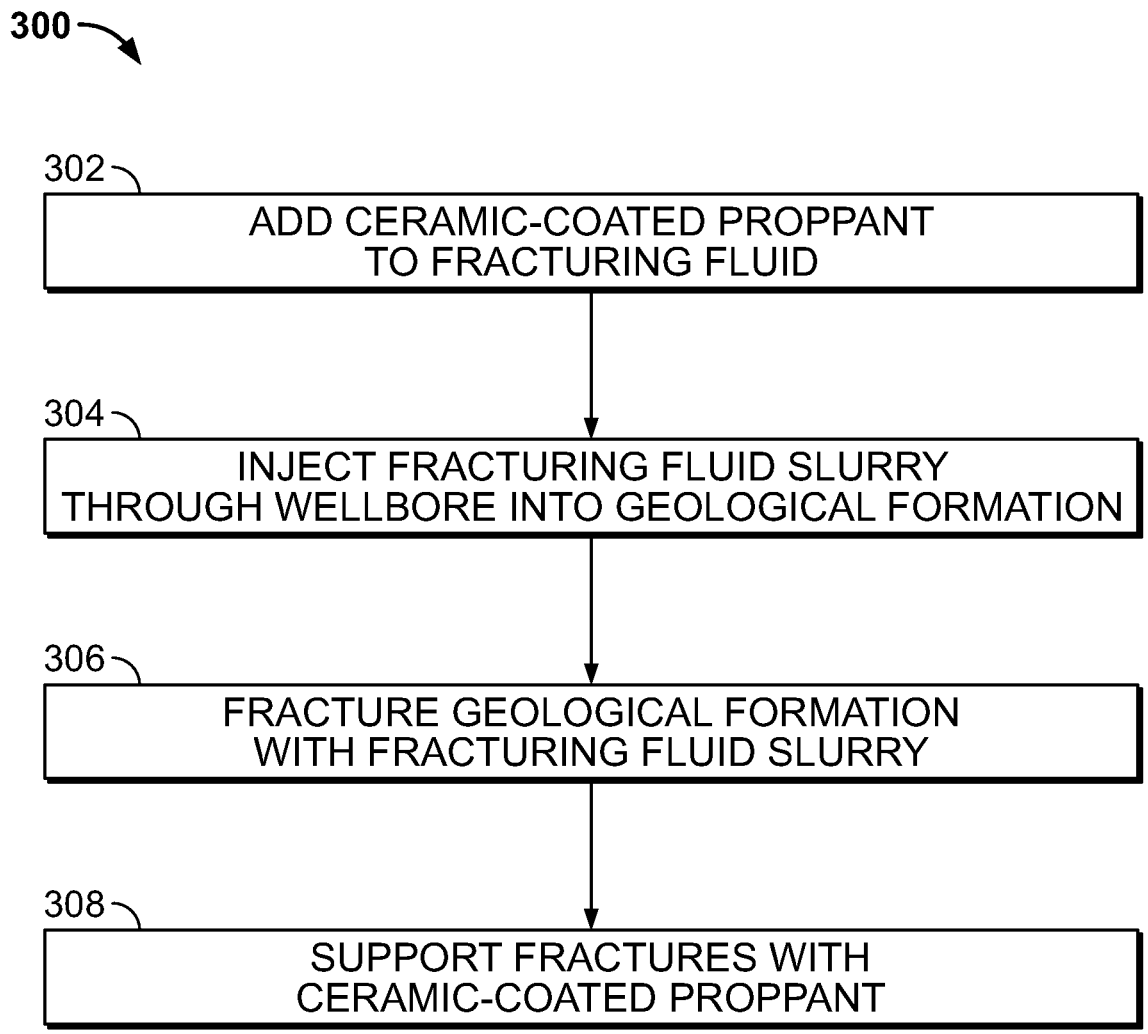
FIG. 3 is a block flow diagram of a method of hydraulic fracturing.

FIG. 3 is a method 300 of hydraulic fracturing. At block 302, the method includes adding ceramic-coated proppant to fracturing fluid. The ceramic-coated proppant may be core proppant coated with a ceramic coating. The core proppant may be a non-ceramic particle (for example, sand, metal particle, or organic particle) or a ceramic particle. The ceramic in the ceramic coating may have an alumina content greater than 40 weight percent. The ceramic coating may include a binder, for example, at less than 1.5 weight percent of the ceramic coating. The ceramic coating may have a bonding additive to restrict delamination of the ceramic coating.

At block 304, the method includes injecting a fracturing fluid through a wellbore into a geological formation. The fracturing fluid may have the added ceramic-coated proppant. The injecting of the fracturing fluid may include pumping the fracturing fluid from the Earth surface into the wellbore. The fracturing fluid may flow through perforations (formed through wellbore casing) into the geological formation.

At block 306, the method includes hydraulically fracturing the geological formation with the fracture fluid to generate fractures in the geological formation. The fracturing fluid injected through the perforations into the geological formation may hydraulically fracture the geological formation to give primary fractures and secondary fractures. The fracturing fluid generating the fractures in the geological formation may include ceramic-coated proppant.

At block 308, the method include positioning the ceramic-coated proppant in the fractures to support the fractures with the ceramic-coated proppant. The injected fracturing fluid having the ceramic-coated proppant may distribute the ceramic-coated proppant into the fractures. The proppant may maintain open the fractures.

The ceramic-coated proppant may be sintered or densified ceramic-coated proppant to increase strength of the proppant for maintaining open the fractures. The ceramic coating of the proppant may include organic fibers, inorganic fibers, organic particles, inorganic particles, or a CMC, or any combinations thereof.

The particles (core proppant) of the various embodiments may include proppant materials to be strengthened by coating with ceramic. The ceramic-coated particles (ceramic-coated proppant) formed may have greater sphericity than the starting-material particles (core proppant). The ceramic-coated proppant may be sintered to provide enhanced strength. The ceramic-coated proppant may have greater compressive strength than the core proppant. Thus, the core proppant (for example, sand) as coated may be employed in environments having closure stresses in which typically the core proppant is not employed. In implementations, the compressive strength of the core proppant may be increased with the ceramic coating by a range of 10% to 300%. The crush resistance stress level (or crush strength) per International Standard ISO 13503-2 (First edition 2006-11-01) by the International Organization for Standardization can reach between 10,000 pounds per square inch (psi) to 40,000 psi. The particles or proppant as core proppant to be strengthen with ceramic coating may include ceramic proppant, wallnut hulls, cementitious particles, and sand (for example, brown sand, multicrystalline sand, or angular sand). The particle size of the core proppant may range from 100 mesh (150 microns) to 12/20 mesh (850 microns to 1700 microns). An example of brown sand is referred to as Brady sand mined from central Texas in the United States of America.

In some implementations, the proppant coating of present techniques may be optionally coated or treated with agents to modify the wettability of the proppant. In certain embodiments, the ceramic-coated proppant is treated with fluorosilane (SiH3F) to give the ceramic-coated proppant a hydrophobic character. In particular implementations, this treating with fluorosilane is performed while the ceramic-coated proppant is cooling after sintering. The fluorosilane may be sprayed onto the ceramic-coated proppant when temperature of the proppant is approximately in the range of 50° C. to 100° C., and the proppant tumbled to promote modifying of the surface of the ceramic-coated proppant. Other surface modifications may make the surface hydrophobic. Some surface modifications implement may make the surface omniphobic.

In certain implementations, the ceramic-coated proppant here may be further coated with thermoset resin such as phenolic, epoxy, furan, urethane, polyimide, polyester, polyurea and the like. See, for example, FIG. 5. These thermoset-resin coatings may increase the strength of ceramic-coated proppant. In some cases, this thermoset resin on the ceramic coating may increase the binding of ceramic-coated particles in a proppant pack for flowback proppant control. These thermoset resins can be functionalized to give a desired wettability. The applied resins as functionalize can be made hydrophobic, hydrophilic, non-wetting, omniphobic, or intermediate wet depending on the applications.

Resin coatings or thermoset resin coatings may be applied, for example, for strength and fines control. However, resin coatings alone (without an underlying ceramic coating) on particles may suffer drawbacks discussed earlier. Ceramic coating can avoid or mitigate some of those deficiencies with a resin coating.

The present techniques may strengthen ceramic particles by ceramic coating followed by sintering. The present techniques may strengthen sand or other non-ceramic particles by ceramic coating followed by sintering. The ceramic coating of sand to strengthen the sand particles as proppant may be beneficial including when the sand alone is of poor quality as a proppant. The ceramic coating can include CMC. The ceramic-coated particle can further be further coated with a resin (for example, a thermoset resin).

Figure 4:
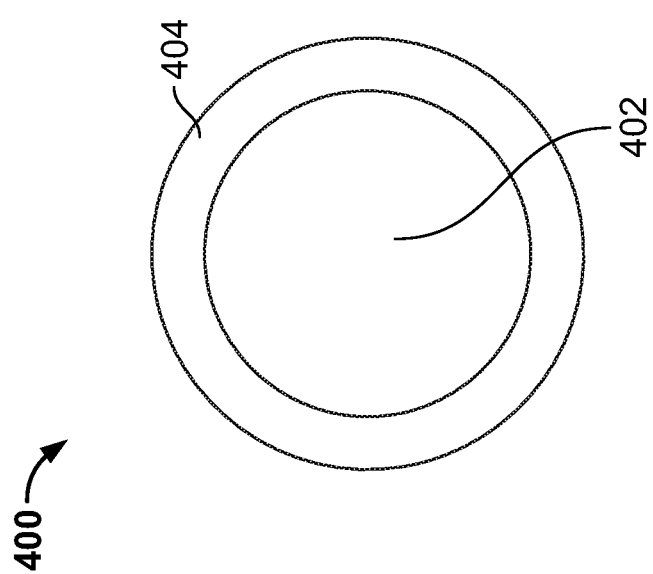
FIG. 4 is a diagram of a ceramic-coated proppant.

FIG. 4 is a proppant 400 having a core particle 402 and a ceramic coating 404. Thus, the proppant 400 is a ceramic-coated particle. The core particle 402 may be inorganic (for example, sand, ceramic, or metal) or organic (for example, wallnut hull or thermoset resin). In some implementations, the core particle 402 itself is a proppant. Thus, the proppant 400 may be a ceramic-coated proppant with the underlying core particle 402 as a proppant. The core particle 402 can generally be any proppant or proppant-like material. The core particle 402 can be ceramic proppant. The core particle 402 can be non-ceramic proppant, such as sand, metal, or organic proppant (for example, walnut hull).

The ceramic coating 404 can be the ceramic coating described in each of the aforementioned embodiments: (1) first embodiment (coating particles with ground ceramic); (2) second embodiment (coating particles with ground ceramic slurry); (3) third embodiment (coating particles with ceramic via solution-gelation); (4) fourth embodiment (coating particles with ceramic via alumina-silica sol-incorporated alpha-alumina powder); and (5) fifth embodiment (coating particles with ceramic coating having ceramic fibers embedded in CMC).

The ceramic coating 404 may include a CMC, such as described with respect to the fifth embodiment and also as discussed later. The ceramic coating 404 as per the first embodiment, second embodiment, third embodiment, fourth embodiment, and fifth embodiment can each include a CMC. CMCs include a reinforcing agent (for example, fibers) embedded in a ceramic matrix. The matrix and reinforcing agent can typically consist of any ceramic material, whereby carbon and carbon fibers can also be considered a ceramic material. The matrix and reinforcing agent can be the same ceramic material type. Examples the reinforcing agent include ceramic fibers that are carbon (C), silicon carbide (SiC), alumina (Al2O3), and mullite (Al2O3-SiO2). In some implementations, the ceramic matrix materials can also be C, SiC, alumina, or mullite. Examples of CMCs (fiber/type of matrix) are $Al_2O_3/Al_2O_3$, C/C, C/SiC, and SiC/SiC. More detailed lists of exemplary materials for the CMC are given later. Further, the CMC may include a non-ceramic reinforcing agent(s) in addition to the ceramic reinforcing agent(s). The reinforcing agent(s) is less than 5 wt % of ceramic coating 404, less than 2 wt % of the ceramic coating 404, or less than 1 wt % of the ceramic coating 404. As indicated, a surface modifier may be applied to the proppant 400. For example, the ceramic coating 404 may be coated or treated with surface modifier. A surface modifier may be agents (for example, SiH3F) to modify the wettability of the proppant 400.

For the CMC of the ceramic coating 404 as a nanocomposite, the reinforcing agents may include nano-reinforcing agents (or nano-fillers). More than one type of nano-reinforcing agent may be employed in the CMC. As discussed later, certain implementations provide for a synergistic effect between two nano-reinforcing agents in the CMC or between a nano-reinforcing agent and the ceramic matrix in the CMC.

The nano-reinforcing agent enhances the mechanical strength of the ceramic coating 404 and provides resistance to chemicals utilized in hydraulic fracturing fluid. The surface modifier imparts gas wetting characteristics to the ceramic coating 404. Thus, application of the surface modifier may reduce interfacial tension and therefore reduce condensate or water blockage in the wellbore, which may increase gas relative permeability and reduce condensate banking. The surface modifier may also impart hydrophobic or oleophobic characteristics to the proppant, such that water will generally not wet the surface and thus the degradation of the proppants due to contact with water may be decreased. These wettability characteristics enhance the load recovery of hydraulic fracturing fluid or water after fracturing operation as the hydrocarbons may experience less friction from contact with the proppant. Consequently, the rate of hydrocarbon production and the overall amount of hydrocarbon production may be increased.

In some implementations, the nano-reinforcing agent may include graphene and carbon nanotubes. The graphene may increase the strength of the proppant coating, increase the conductivity of the proppants, or both. The graphene can be provided in any desirable form or combination of forms, for example, sheets, platelets, fibers, chemically-modified graphene, doped graphene, graphene nanotubes, functionalized graphene, grossly warped nanographene, or combinations of these. In some embodiments, the graphene includes graphene oxide, graphite, or combinations of these. Graphene or derivatives of these can be combined with one or more other types of carbon molecules such as diamonds, graphite nanotubes, fullerenes, or combinations of these. Graphene can be produced, for example, by exfoliation, epitaxial growth, chemical vapor deposition, electrostatic force, reduction of graphene oxide or carbon dioxide, sonication, nanotube excision, metal-carbon melts, spark plasma sintering, pyrolysis, or any combinations of these.

The carbon nanotubes include at least one of single-walled nanotubes, double-walled nanotubes, multi-walled carbon nanotubes, or narrow-walled nanotubes. The carbon nanotubes include a diameter of from 1 nm to 200 nm, from 20 nm to 100 nm, from 10 nm to 80 nm, from 4 nm to 20 nm, from 2 nm to 12 nm, or less than 100 nm or less than 80 nm. The carbon nanotubes include a length of from 20 μm to 500 μm or 50 μm to 200 μm, or less than 200 μm or less than 100 μm. The carbon nanotubes include an aspect ratio of from 100 to 100,000, from 100 to 50,000, from 500 to 30,000, or less than 30,000. The term "aspect ratio" refers to a ratio of width to length.

The nano-reinforcing agent may include ceramic materials, metallic materials, organic materials, inorganic materials, mineral-based materials or any combination of these. Ceramic materials include, but are not limited to, alumina, zirconia, stabilized zirconia, mullite, zirconia toughened alumina, spinel, aluminosilicates (such as mullite or cordierite), silicon carbide, silicon nitride, titanium carbide, titanium nitride, aluminum oxide, silicon oxide, zirconium oxide, stabilized zirconium oxide, aluminum carbide, aluminum nitride, zirconium carbide, zirconium nitride, aluminum oxynitride, silicon aluminum oxynitride, silicon dioxide, aluminum titanate, tungsten carbide, tungsten nitride, steatite, or any combination of these. Metallic materials include, but are not limited to, iron, nickel, chromium, silicon, aluminum, copper, cobalt, beryllium, tungsten, molybdenum, titanium, magnesium, silver, as well as alloys of metals, and the like, or any combination of these. Metallic materials may also include the family of intermetallic materials, such as iron aluminides, nickel aluminides, and titanium aluminides. Organic materials include, but are not limited to, carbon-based structures such as carbon nanotubes, single walled carbon nanotubes (SWNT), double walled nanotubes (DWNT), multi-walled carbon nanotubes (MWNT), armchair nanotubes, zig-zag nanotubes, helical nanotubes, bundles of single wall nanotubes, bundles of multi-wall nanotubes, nanofibers, nanorods, nanowires, nanospheres, microspheres, whiskers of oxide, fullerenes, graphene, carbon fibers, graphite fibers, nomex fibers, or combinations of these. Inorganic materials include, vanadium pentoxide nanotubes, boron-nitride nanotube, tungsten, disulfidezinc oxide, diamond, clay, boron, boron nitride, silver, titanium dioxide, carbon, molybdenum disulfide, γ-aluminium oxide, titanium, palladium, tungsten disulfide, silicon dioxide, graphite, zirconium(IV) oxide-yttria stabilized, carbon, gd-doped-cerium(IV) oxide, nickel cobalt oxide, nickel(II) oxide, rhodium, sm-doped-cerium (IV) oxide, barium strontium titanate and silver. Mineral-based particulates include, but are not limited to, such materials as kyanite, mica, quartz, sapphire, corundum, aluminosilicate minerals, and combinations of these. In certain implementations, the nano-reinforcing agent may be at least one of nano-silica, nano-alumina, nano-zinc oxide, carbon nanotubes, nano-calcium carbonate, mica, vanadium pentoxide, boron nitride nanotubes, or nano-zirconium oxide.

In one implementation, the coating 404 includes a reinforcing agent that is a coated carbon nanotube, such as zinc sulfide (ZnS) coated carbon nanotubes. ZnS coated carbon nanotubes provide additional thermal stability and mechanical strength. Weight loss as a function of temperature for ZnS-coated multi-walled carbon nanotubes (MWCNT) is less than for non-coated MWCNT. The ZnS coated multi-walled carbon nanotubes retain greater weight in thermogravimetric analysis (TGA) compared to multi-walled carbon nanotubes without a ZnS coating.

In another implementation, the ceramic coating 404 includes silica (SiO2) coated single-walled carbon nanotubes (SWNT). SiO2 coated carbon nanotubes may better fuse with neighboring proppants in a subsurface formation, generate a stronger proppant pack, and mitigate proppant flowback.

Reinforcing the ceramic matrix by mixing in two nano-reinforcing agents may increase the proppant crush resistance performance. The two nano-reinforcing agents may include: (1) the nano-reinforcing agent in the form of tubes, fibers, rope, fibrils, or combinations of these, dispersed in the ceramic coating and bonded to (2) the nano-reinforcing agent in the form of platelets, 2-dimensional (2D) surface, ribbons, or combinations of these. In some embodiments, the two nano-reinforcing agents may include carbon nanotubes (which have an aspect ratio of greater than 100) and graphene (which provides a 2D planar surface) to give mechanical bridging throughout the proppant coating. This synergistic effect further improves electrical conductivity as compared to a proppant coating including carbon nanotubes without graphene.

The coexistence of nanotubes and graphene fillers shows a distinct synergistic effect in improving the tensile properties. The ability of nanotubes and graphene to synergistically reinforce the polymer matrix is ascribed to the interfacial interaction between filler and matrix and the nanotube-graphene interconnections. Specifically, the molecular couplings between the nanotubes and graphene may transfer load when the proppant coating is under stress. Furthermore, the MWCNTs-GNPs network structures may dissipate mechanical energy throughout the proppant coating. There are synergistic qualities of carbon nanotubes and graphene.

As discussed, surface modifiers may be applied to the ceramic-coated proppant 400 (or to the ceramic-coated proppant 500 of FIG. 5) to give wetting properties, enhance different component compatibility, or improve the appearance of a coating surface. The surface modifier may be at least one of an alkyl fluorosilane solution, a fluorinated surfactant, a fluorinated polymer, and a fluorinated polymeric surfactant. The alkyl fluorosilane solution, which functions as a surface modifier, may include triethoxy(tridecafluorooctyl)silane. The alkyl fluorosilane solution may include triethoxy(tridecafluorooctyl)silane, for example, in ranges of 1 volume percent (vol %) to 10 vol %, 1 vol % to 8 vol %, 1 vol. % to 6 vol %, or 1 vol. % to 4 vol %, or at least 2 vol %. The surface modifier may include a solvent or alcohol (for example, propanol), for instance, in a range of 90 vol % to 99 vol %. The surface modifier may have the following properties: a pH of less than 7, 6, 5, 4, 3, 2, or 1; a boiling point in a range of 70° C. to 90° C. or 75° C. to 85° C., or at least 75° C. (for example, about 82° C.); a viscosity in a range of 1 millipascal seconds (mPa·s) to 10 mPa·s, 1 mPa·s to 5 mPa·s, 1 mPa·s to 4 mPa·s, 2 mPa·s to 5 mPa s, or 2 mPa·s to 4 mPa·s (for example, about 2 mPa s); and a density in a range of 0.5 gram per cubic centimeter ($g/cm^3$) to 1.5 $g/cm^3$ or 0.7 $g/cm^3$ to 1 $g/cm^3$ (for example, about 0.8 $g/cm^3$).

Figure 5:
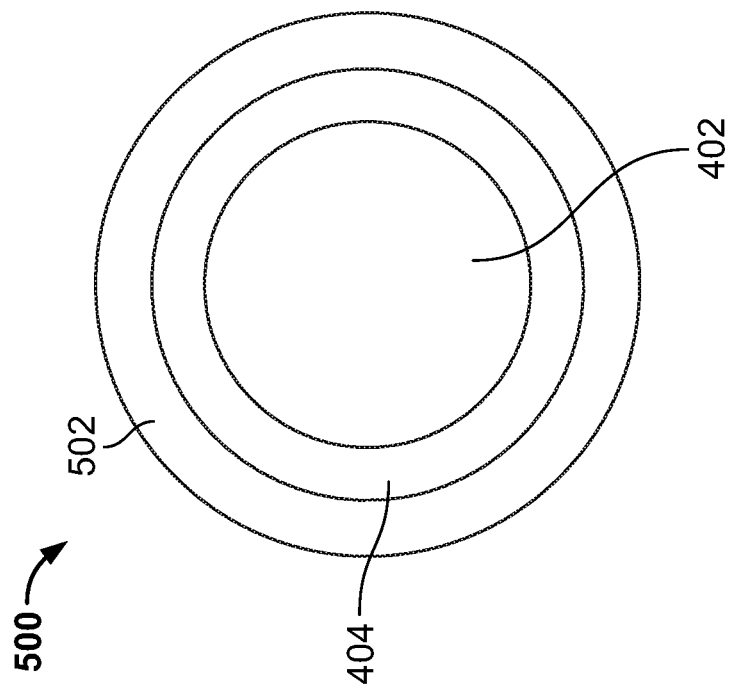
FIG. 5 is a diagram of a ceramic-coated proppant having an outer polymer layer.

FIG. 5 is a ceramic-coated proppant 500 that is the ceramic-coated 400 (FIG. 4) having a polymer coating 502 (an outer polymer layer). Thus, the ceramic-coated proppant 500 may be characterized as double coated. The ceramic-coated proppant 500 includes the core particle 402 (for example, core proppant) having the ceramic coating 404 and the polymer coating 502. The ceramic-coated proppant 500 includes the polymer coating 502 at a weight percent in a range of 0.5% to 15%, 0.5% to 10%, 1.0% to 8%, 1.5% to 6%, 1.0% to 5%, or 0.5% to 4.5%, or at least 2% or at least 4%.

In hydraulic fracturing of a geological formation with hydraulic fracturing fluid having the ceramic-coated proppant 500, the polymer coating 502 may facilitate support pillar fracturing and flow back. When the polymer coating 502 (outer polymeric layer) is degraded, the ceramic coating 404 provides for longer service life of the proppant 500 than without the ceramic coating 404.

The polymer applied as the polymer coating 502 may include resin (including thermoset resin), polyester, urea aldehyde, polyurethane, vinyl esters, or furfural alcohol, or any combinations of these. Resin is a substance of plant or synthetic origin that is typically convertible into polymers. The resin may be a mixture of organic compounds, such as terpenes that are organic compounds produced by plants. The viscosity of resin may be greater than 20 cP measured at a temperature of 120° C. The resin may include phenolic resin, epoxy resin, furan resin, polyurethane resin, polyurea resin, polyester, polyamide-imide resin, polyamide resin polyurea/polyurethane resin, urea-formaldehyde resin, melamine resin, silicone resin, vinyl ester resin, or combinations of these. The resin may be novolacs that are phenol-formaldehyde resins with a formaldehyde to phenol molar ratio of less than 1 and where the phenol units are mainly linked by methylene or ether groups, or both. Novolacs are stable meaning that novolacs generally do not react and do retain their polymer properties at temperatures of up to 300° F., 400° F., 425° F., 450° F., 475° F., 500° F., 550° F., or 600° F. The novolac polymer may have a glass transition temperature, for example, greater than 250° F., 300° F., 350° F., 390° F., 400° F., 450° F., or 500° F. Resoles are phenol-formaldehyde resins with a formaldehyde to phenol molar ratio of more than 1 and where the phenol units are mainly linked by methylene or ether groups, or both. The resoles formulation can harden without the addition of a crosslinking agent due to abundance of methylene to bridge the phenol groups. Both the novolac polymer and resoles may each have a molecular weight, for example, in ranges of 1,000 to 100,000 grams per mole (g/mol), 1,000 to 50,000 g/mol, 1,000 to 25,000 g/mol, 5,000 to 100,000 g/mol, or 10,000 to 50,000 g/mol.

An embodiment is a method of forming a ceramic-coated proppant, including receiving a proppant and coating the proppant (e.g., inorganic proppant, organic proppant, sand, ceramic proppant, etc.) with ceramic to give a ceramic coating (having a CMC) on the proppant. The action of coating the proppant with ceramic may include coating the proppant with ground ceramic including comprising calcined clay, uncalcined clay, bauxite, silica, geopolymer, or alumina, or any combinations thereof. The ground ceramic may have an alumina content greater than 40 wt %. The coating of the proppant with ground ceramic may involve coating the proppant via a slurry having the ground ceramic and water, wherein the slurry has a solids content in a range of 10 wt % to 50 wt %. The coating of the proppant with ceramic may include coating the proppant with the ceramic by solution gelation. The coating of the proppant with ceramic may include coating the proppant with alumina-silica sol-incorporated alpha-alumina powder. The method may include drying and sintering the ceramic coating on the proppant to give the ceramic-coated proppant. The method may include densifying the ceramic coating by thermal treatment at a temperature in a range of 600° C. to 1400° C.

Another embodiment is a method of forming ceramic-coated proppant including forming ceramic coating on particles. The particles are core proppant of the ceramic-coated proppant. The ceramic coating includes a CMC. The particles may be sand, cementitious particles, inorganic core proppant (e.g., sand, metal, or ceramic), organic core proppant, etc. The ceramic coating may include calcined clay, uncalcined clay, bauxite, silica, geopolymer, or alumina, or any combinations thereof. The ceramic coating may include organic fibers, inorganic fibers, organic particles, or inorganic particles, or any combinations thereof. The forming of the ceramic coating on the particles may involve applying ground ceramic to the particles, wherein applying the ground ceramic includes coating the particles with the ground ceramic via a drum coater, a mixing granulator, or spray coating, or any combinations thereof. The forming of the ceramic coating on the particles may involve applying a slurry of ground ceramic to the particles, wherein the slurry has a solids content in a range of 10 wt % to 50 wt %. The forming of the ceramic coating on the particles may include applying ceramic to the particles by solution gelation. The forming of the ceramic coating on the particles may include applying alumina-silica sol-incorporated alpha-alumina to the particles.

Yet another embodiment is a method of hydraulic fracturing, including injecting a fracturing fluid through a wellbore into a geological formation. The fracturing fluid includes a ceramic-coated proppant that is a core proppant coated with a ceramic coating having a CMC. The method includes hydraulically fracturing the geological formation with the fracture fluid (thereby generating fractures in the geological formation) and positioning the ceramic-coated proppant in the fractures. The ceramic coating may include calcined clay, uncalcined clay, bauxite, silica, geopolymer, or alumina, or any combinations thereof. The ceramic-coated proppant may include sintered ceramic-coated proppant having an alumina content greater than 40 weight percent. The method may include supporting the fractures with the ceramic-coated proppant positioned in the fractures. The ceramic coating may include a binder that is less than 1.5 wt % of the ceramic coating. The ceramic coating may include a bonding additive to restrict delamination of the ceramic coating. The ceramic coating may include a solution-gelation coating, alumina-silica sol-incorporated alpha-alumina, or a densified ceramic coating.

Yet another embodiment is a method of forming a ceramic-coated proppant. The method includes receiving a proppant and coating the proppant with ceramic to give a ceramic coating on the proppant. The action of coating the proppant with ceramic includes coating the proppant with ground ceramic comprising calcined clay, uncalcined clay, bauxite, silica, geopolymer, or alumina, or any combinations thereof. The action of coating the proppant with ground ceramic may involve coating the proppant via a slurry having the ground ceramic and water, wherein the slurry has a solids content in a range of 10 wt % to 50 wt %.

Yet another embodiment is a method of forming a ceramic-coated proppant. The method includes receiving a proppant (e.g., sand) that is not ceramic, and coating the proppant with ceramic to give a ceramic coating on the proppant. The proppant may be inorganic proppant not including ceramic. The action of coating the proppant with ceramic may include coating the proppant with ground ceramic including calcined clay, uncalcined clay, bauxite, silica, geopolymer, or alumina, or any combinations thereof. The coating of the proppant with ceramic may include coating the proppant via a slurry comprising ground ceramic and water, wherein the slurry has a solids content in a range of 10 wt % to 50 wt %. The action coating of the proppant with ceramic may include coating the proppant with a CMC. The action of coating the proppant with ceramic may include coating the proppant with the ceramic by solution gelation. The action of coating the proppant with ceramic may include coating the proppant with alumina-silica sol-incorporated alpha-alumina powder.

Yet another embodiment is method of hydraulic fracturing, including injecting a fracturing fluid through a wellbore into a geological formation. The fracturing fluid includes a ceramic-coated proppant that is a core proppant coated with a ceramic coating, wherein the core proppant does not include ceramic. The method includes hydraulically fracturing the geological formation with the fracture fluid to generate fractures in the geological formation, and conveying the ceramic-coated proppant via the fracturing fluid into the fractures. The core proppant may include wallnut hulls, cementitious particles, or sand, or any combinations thereof. The ceramic-coated proppant may be further coated with a thermoplastic resin, polymer derived resin (PDC), or thermoset resin, or any combinations thereof. The ceramic-coated proppant may be treated with fluorosilane.

A number of implementations have been described. Nevertheless, it will be understood that various modifications may be made without departing from the spirit and scope of the disclosure.

What is claimed is:

1. A method of forming a ceramic-coated proppant, comprising:
preparing a mixture comprising ground ceramic and fibers, wherein the ground ceramic comprises calcined clay, uncalcined clay, bauxite, silica, geopolymer, or alumina, or any combinations thereof, wherein the ground ceramic comprises an alumina content greater than 40 weight percent (wt %), wherein the ground ceramic comprises a mean particle size in a range of 1 micron to 12 microns, and wherein the fibers comprise ceramic fibers, silicon carbide fibers, alumina fibers, mullite fibers, or fiberglass fibers, or any combinations thereof;
receiving a proppant; and
coating the proppant with the mixture to give a ceramic coating on the proppant, wherein the ceramic coating comprises a ceramic matrix composite (CMC) comprising the ground ceramic and the fibers, wherein the fibers are a reinforcing agent in the CMC.

2. The method of claim 1, wherein the proppant comprises inorganic proppant.

3. The method of claim 1, wherein the proppant comprises organic proppant.

4. The method of claim 1, wherein the proppant comprises sand.

5. The method of claim 1, wherein the proppant comprises ceramic proppant.

6. The method of claim 1, comprising adding a binder comprising poly(2-ethyl-2-oxazoline) to the mixture.

7. The method of claim 1, wherein coating the proppant with the mixture comprises applying the mixture to the proppant via a mixer or drum coater, or any combinations thereof, wherein water is added to the mixer or drum coater to facilitate the mixture sticking to the proppant and forming a layer on the proppant, and wherein the mixer comprises at least one of a mixing granulator or a high-intensity mixer having a mixing tool operated at a tip speed greater than 25 meters per second.

8. The method of claim 1, wherein coating the proppant with the mixture comprises coating the proppant by applying a slurry comprising the mixture and water to the proppant, wherein the slurry comprises a solids content in a range of 10 wt % to 50 wt %, and wherein applying the slurry to the proppant comprises drum coating, spray coating, fluidized-bed coating, wet-dip coating, or applying via a mixer that is a granulator, or any combinations thereof.

9. The method of claim 1, wherein coating the proppant with the mixture comprises coating the proppant with the mixture by solution gelation.

10. The method of claim 1, wherein coating the proppant with the mixture comprises coating the proppant with alumina-silica sol-incorporated alpha-alumina powder.

11. The method of claim 1, comprising drying and sintering the ceramic coating on the proppant to give the ceramic-coated proppant, wherein the fibers do not comprise ceramic whiskers.

12. The method of claim 1, comprising densifying the ceramic coating by thermal treatment at a temperature in a range of 600° C. to 1400° C.

13. A method of forming ceramic-coated proppant, comprising:
forming ceramic coating on particles, wherein the particles are core proppant of the ceramic-coated proppant, and wherein the ceramic coating comprises a ceramic matrix composite (CMC) comprising fibers in ceramic, wherein the fibers are a reinforcing agent in the CMC, and wherein the fibers comprise ceramic fibers, silicon carbide fibers, alumina fibers, mullite fibers, or fiberglass fibers, or any combinations thereof, wherein the forming comprises:
receiving the particles;
preparing a mixture comprising ground ceramic and the fibers, wherein the ground ceramic comprises calcined clay, uncalcined clay, bauxite, silica, geopolymer, or alumina, or any combinations thereof, wherein the ground ceramic comprises an alumina content greater than 40 weight percent (wt %), and wherein the ground ceramic comprises a mean particle size in a range of 1 micron to 12 microns; and
coating the particles with the mixture.

14. The method of claim 13, wherein the particles comprise sand or cementitious particles.

15. The method of claim 13, wherein the particles comprises inorganic core proppant.

16. The method of claim 15, wherein the inorganic core proppant comprises sand, metal, or ceramic.

17. The method of claim 13, wherein the particles comprises organic core proppant.

18. The method of claim 13, wherein the forming comprises adding a binder comprising poly(2-ethyl-2-oxazoline) to the mixture, and wherein the fibers do not comprise ceramic whiskers.

19. The method of claim 13, wherein coating the particles with the mixture comprises applying the mixture to the particles via a drum coater, a mixing granulator, or spray coating, or any combinations thereof.

20. The method of claim 19, wherein applying the mixture on the particles comprises applying a slurry comprising the mixture and water to the particles, and wherein the slurry comprises a solids content in a range of 10 wt % to 50 wt %.

21. The method of claim 13, wherein applying the mixture on the particles comprises applying the mixture to the particles by solution gelation.

22. The method of claim 13, wherein applying the mixture on the particles comprises applying alumina-silica sol-incorporated alpha-alumina to the particles.

* * * * *